(12) United States Patent
Tailor et al.

(10) Patent No.: US 10,107,438 B2
(45) Date of Patent: Oct. 23, 2018

(54) APPARATUS CONTAINING MULTIPLE SEQUENTIALLY USED INFRARED HEATING ZONES FOR TUBULAR ARTICLES

(75) Inventors: Dilip Kumar Tailor, Mississaugo (CA); Mark Phillip Brandon, Toronto (CA); Emerson John Tacoma, Georgetown (CA); Shawn Doyle, Georgetown (CA); David Seepersaud, Etobicoke (CA)

(73) Assignee: SHAWCOR LTD., Toronto, Ontario (CA)

( * ) Notice: Subject to any disclaimer, the term of this patent is extended or adjusted under 35 U.S.C. 154(b) by 1104 days.

(21) Appl. No.: 14/357,121

(22) PCT Filed: Jul. 27, 2012

(86) PCT No.: PCT/CA2012/050511
§ 371 (c)(1),
(2), (4) Date: Nov. 10, 2014

(87) PCT Pub. No.: WO2013/067631
PCT Pub. Date: May 16, 2013

(65) Prior Publication Data
US 2015/0219264 A1    Aug. 6, 2015

Related U.S. Application Data

(60) Provisional application No. 61/558,037, filed on Nov. 10, 2011.

(51) Int. Cl.
*F16L 47/22*  (2006.01)
*H05B 3/58*   (2006.01)
(Continued)

(52) U.S. Cl.
CPC .............. *F16L 47/22* (2013.01); *B25B 5/147* (2013.01); *B29C 61/02* (2013.01);
(Continued)

(58) Field of Classification Search
CPC . B29C 63/42; F16L 47/22; H05B 3/44; H05B 3/46
(Continued)

(56) References Cited

U.S. PATENT DOCUMENTS 3,353,005 A    11/1967  Sisson et al.
3,475,592 A    10/1969  Berkl
(Continued)

FOREIGN PATENT DOCUMENTS

AU    550137 B2    3/1986
CA    2658494      3/2010
(Continued)

OTHER PUBLICATIONS

Casso-Solar Corporation, "Casso Solar V-Series Brochure," http://web.archive.org/web/20090704150645/http://www.cassosolar.com/download/CS%20V%20Series%20brochure.pdf, Jul. 4, 2009, pp. 1-2.
(Continued)

*Primary Examiner* — Scott W Dodds
(74) *Attorney, Agent, or Firm* — K&L Gates LLP

(57) ABSTRACT

An apparatus for heating an elongate tubular article, such as a heat shrinkable sleeve applied around a welded pipe joint during pipeline construction. The apparatus is in the form of a frame which can be disposed around the article, the frame having a heater device having both longitudinally disposed heating zones and radially disposed heating sectors, each of which can be independently controlled. Alternatively, or in combination, the apparatus can have an air circulation system. Also, a method for shrinking a heat shrinkable sleeve comprising use of said apparatus.

3 Claims, 35 Drawing Sheets

(51) Int. Cl.
  *F16L 58/18* (2006.01)
  *B29C 63/42* (2006.01)
  *B25B 5/14* (2006.01)
  *B32B 37/06* (2006.01)
  *B32B 37/08* (2006.01)
  *B32B 37/14* (2006.01)
  *B32B 37/22* (2006.01)
  *B32B 38/00* (2006.01)
  *B29C 63/00* (2006.01)
  *B29C 61/02* (2006.01)

(52) U.S. Cl.
  CPC .......... *B29C 63/0004* (2013.01); *B29C 63/42* (2013.01); *B32B 37/06* (2013.01); *B32B 37/08* (2013.01); *B32B 37/142* (2013.01); *B32B 37/22* (2013.01); *B32B 38/0036* (2013.01); *F16L 58/181* (2013.01); *H05B 3/58* (2013.01); *B32B 2307/31* (2013.01); *B32B 2597/00* (2013.01)

(58) Field of Classification Search
  USPC ........................................ 156/309.6, 311, 84
  See application file for complete search history.

(56) References Cited

U.S. PATENT DOCUMENTS

| | | | |
|---|---|---|---|
| 3,515,853 | A | 6/1970 | McAdams |
| 3,525,850 | A | 8/1970 | Hager, Jr. |
| 3,567,907 | A | 3/1971 | Carpenter |
| 3,612,828 | A | 10/1971 | Siegla |
| 4,325,762 | A | 4/1982 | Burmeister et al. |
| 4,460,820 | A | 7/1984 | Matsumoto et al. |
| 4,472,468 | A | 9/1984 | Tailor et al. |
| 4,551,614 | A | 11/1985 | Johnson |
| 4,595,607 | A | 6/1986 | Betteridge et al. |
| 4,628,989 | A | 12/1986 | Parker et al. |
| 4,749,843 | A | 6/1988 | Abramson |
| 5,060,289 | A | 10/1991 | Abramson |
| 5,434,387 | A | 7/1995 | Haley |
| 9,080,701 | B2 | 7/2015 | George et al. |
| 2010/0254687 | A1 | 10/2010 | George et al. |
| 2012/0090765 | A1 | 4/2012 | Tailor et al. |

FOREIGN PATENT DOCUMENTS

| | | |
|---|---|---|
| CN | 202065610 U | 12/2011 |
| EP | 0112922 A1 | 7/1984 |
| EP | 0 417 375 A1 | 9/1989 |
| EP | 0 952 084 A1 | 10/1999 |
| GB | 1343589 | 1/1974 |
| GB | 2262146 A | 6/1993 |
| JP | 59-215819 A | 12/1984 |
| JP | 2003-11221 A | 1/2003 |
| JP | 2006-194368 | 7/2006 |
| WO | WO 92/02355 A1 | 2/1992 |
| WO | WO 2010/102392 A1 | 9/2010 |
| WO | WO 2010/130345 A1 | 11/2010 |

OTHER PUBLICATIONS

Herschel Far Infrared Heaters, "Types of Infrared Heater," definitions, obtained Dec. 18, 2015.
Krelus AG, "The fast medium wave KRELUS Infrared-heaters," http://web.archive.org/web/20100217000642/http://www.krelus.ch/www/images/pdf/Prospekt_en.pdf, Feb. 14, 2010, pp. 1-8.
Krelus AG, "Krelus AG Website—Products Page," http://web.archive.org/web/20080517804735/http://www.krelus.ch/www/produit.php?lang=en, May 17, 2008, p. 1.
Radient Heating with Infrared, A Technical Guide to Understanding and Applying Infrared Heaters, 1997, pp. 1-39.
Stuart, Barbara H., "Appendix Infrared Spectra of Polymers, Analytical Techniques in Materials Conservation," http://onlinelibrary.wiley.com/doi/10.1002/9780470060520.app1/pd, Feb. 9, 2007, pp. 1-8.
Watlow, "Watlow Catalog (Extract)," http://web.archive.org/web/20060413225056/http://www.watlow.com/literature/catalogs/files/heaters.pdf, Apr. 13, 2006, pp. 1-28.

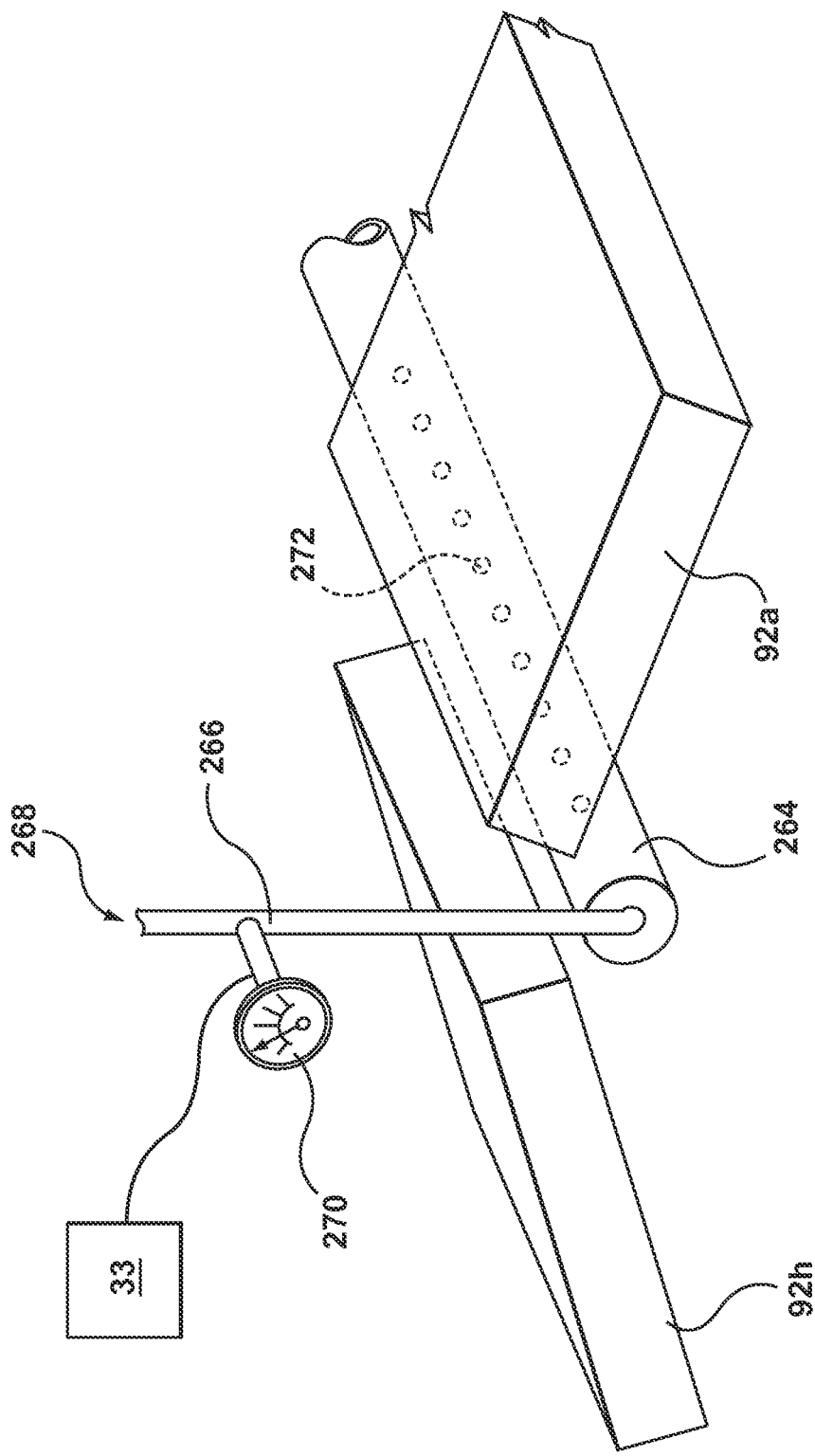

S-Lay

J-Lay

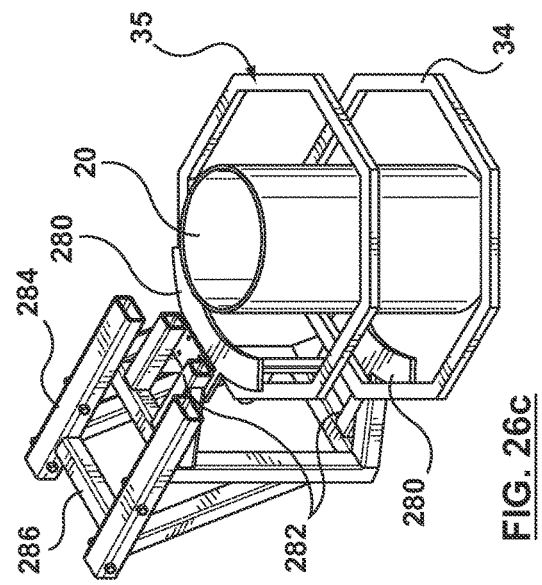
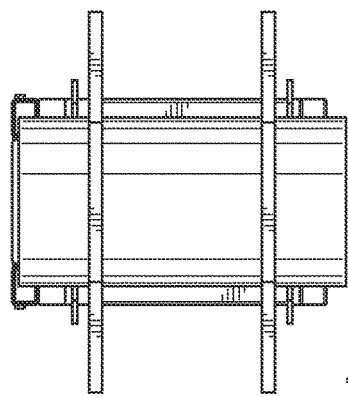
FIG. 26c
FIG. 26d
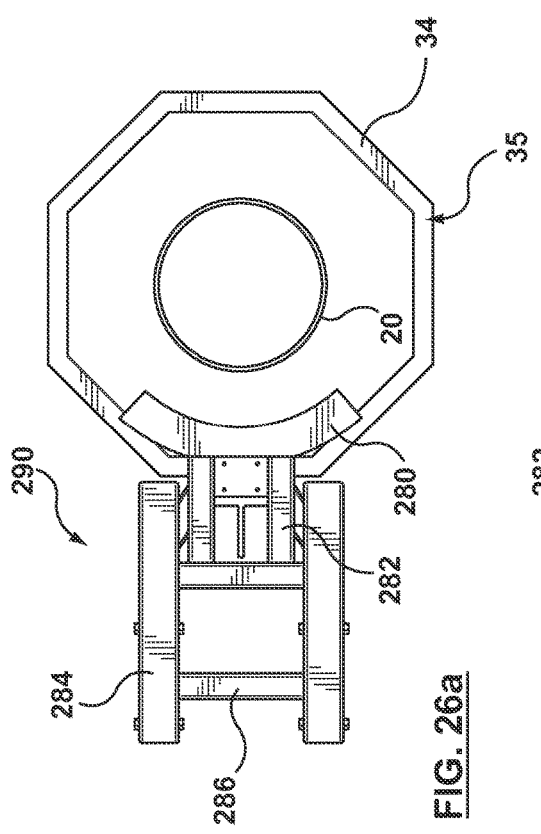
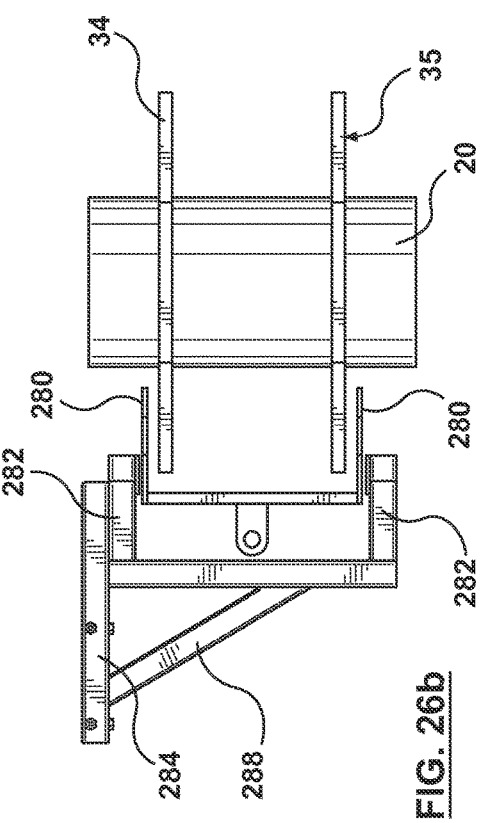
FIG. 26a
FIG. 26b

APPARATUS CONTAINING MULTIPLE SEQUENTIALLY USED INFRARED HEATING ZONES FOR TUBULAR ARTICLES

This application is a national stage application claiming priority to and the benefit of International Application No. PCT/CA2012/050511, filed on Jul. 27, 2012, which in turn claims priority to and the benefit of U.S. Patent Application Ser. No. 61/558,037, filed Nov. 10, 2011. The subject matter of each such application is incorporated herein by reference.

FIELD OF THE INVENTION

The invention relates to improvements to an apparatus for heating an elongate tubular article, for example, heating a heat shrinkable sleeve applied around a welded pipe joint during pipeline construction, or for pre-heating a welded pipe joint before treating or coating.

BACKGROUND OF THE INVENTION

Usually, pipe for pipeline construction is coated with a mainline polymer coating leaving the ends of the pipe bare to allow the exposed ends to be welded together at a pipe joint. There are several different ways used in the art to coat pipe joints. One such way is the use of a heat shrinkable sleeve applied around the welded pipe joint. The sleeve is fitted to the pipe joint, then heat shrunk down onto the joint. Alternatively, a film or tape wrapping can be used. This can be, for example, a polypropylene film, which is wrapped around the pipe joint. The film or tape wrapping requires use of heat and tension to fuse the wrapping to itself as it is applied to the pipe joint. Typically, the film or tape wrapping is also applied over the ends of the pipeline coating, to form a complete coating of the exposed pipe. Such film or tape wrapping typically requires pre-heating of the exposed pipe to facilitate or enable fusion of the wrapping to the pipe. A further alternative way of coating the welded pipe joint is an injection moulding method, whereby the exposed pipe joint is encased with a mould, and a polymer, such as polypropylene or polyurethane, is pressure injected into the mould. The polymer is allowed to cool, and the mould is removed, leaving a pipe joint that is coated with polymer. As can be appreciated, such a method also benefits from the pre-heating of the exposed pipe, so that the injected polymer is not cooled too quickly upon contact with the pipe and a good adhesion to the substrate is affected. These injection moulding and film or tape wrapping methods have an advantage over the use of heat shrinkable sleeves in situations where the mainline coating is extremely thick, and the joint cavity needs to be filled.

In the case of heat shrinkable sleeves applied around a welded pipe joint during pipeline construction, typically, such sleeves are heated and shrunk down onto the joint or other article using a hand held flame torch (see, for example, U.S. Pat. No. 4,472,468, entitled "Heat Shrinkable Covering and Method for Applying Same", issued Sep. 18, 1984, which is incorporated herein by reference). In some cases, this manual operation produces an imperfect installation because of air trapped underneath the shrunk down sleeve. This can arise when the ends of the sleeve are shrunk down before the middle portion of the sleeve. Artful application of the torch is critical. If the torch is tilted outwardly the end zones of the sleeve may shrink first leading to air entrapment. Windy conditions may spread the flame and shrink the end zones of the sleeve prematurely. Further, unless the torch is moved carefully, the torch flame may burn the sleeve and cause it to split. Where a large area needs to be heated, it becomes difficult or impossible to maintain the heat while the sleeve is being shrunk; this leads to wrinkling of the sleeve, imperfect installation due to trapped air, tearing, or scorching of the heat shrink material. Sometimes, it also results in improper or incomplete adherence of the heat shrink material around the welded pipe joint.

Before the field joints coatings are applied over the joint, the joint has to prepared in prescribed manner required for the coating type. Typically, for heat shrink sleeves, tapes and wrap systems, and injection molding, the steel is usually grit blasted, and in rare cases, power wire brushed to obtain white metal or near white metal finish. The mainline coating is usually prepared in order to clean it, and often impart roughness by abrading or light grit blasting. The joint usually requires preheating to remove moisture, but more importantly to achieve certain temperature consistent with coating type to obtain adhesion or fusion of the joint coating to the steel and to the mainline coating. For example, for polypropylene type shrink sleeves, where the adhesive may have melting point of around 155° C., the preheat of the steel is often 180° C. The preheating is often done by using induction heating, which heats the steel only, and indirectly the mainline polymeric coating. Since the exposed steel is directly heated, it can be taken to the desired temperature readily, however, the mainline coating gets heated via the heat conducted by the heated steel underneath. Therefore there is time lag for the coating surface to heat up, and there is often 40-100° C. temperature difference on the steel and coating surface temperature, depending on the coating thickness. For example, on a 610 mm diameter pipe with a wall thickness of 25 mm, when the joints steel temperature reaches 180° C., a polypropylene coating of a 5 mm thickness may only reach 100° C. -120° C. Therefore when subsequently applying a heat shrink sleeve over a joint with such substrate heat profile, the sleeve requires more heat to be applied near the ends overlapping over the mainline coating in order for the sleeve to adhere to the exposed steel and the mainline coating to form a sound protective seal.

The differences in materials in the exposed steel, and the mainline coating result in different heat requirements during the preheating. In some cases, for example, excess heat at the pipe joint may overheat the mainline coating and damage it. During preheating, more intense heat is generally required on the exposed steel, and less intense heat being required the coated pipe, due to the properties of the material used in the mainline coating. For example, where a pipe has a thick mainline coating, made of polymeric material, the exposed steel will have different specific heat, heat resistance, retention and conductivity characteristics than the mainline coating. Thus, the exposed steel may require a more intense heat (which would damage the mainline coating), but may require it for a shorter amount of time, with the mainline coating requiring a lower heat, for a longer period of time, in order for the heat to absorb into the coating thickness. In addition, where heat is applied using a hand held flame torch, the operator of the torch must bear in mind the differences in thicknesses of the different zones to be coated, and radially adjust the torch position accordingly. For example, the thickness of the mainline coating may be substantial, and the operator may need to move the torch a substantial distance in order to keep the same distance between the torch and the area to be heated.

The sizes and configurations of torches and heating implements vary greatly in the field, as do the sizes and configurations of the pipes to be treated. Sometimes, large powerful torches are used. These tend to flare out greatly and do not allow focused heating of the shrink sleeve, thereby causing air entrapment due to prematurely shrunk sleeve ends. Sometimes four torches are used to shrink a sleeve to get fast production rates, with two operators on one side of the pipe and two on the other. This practice makes it very difficult to selectively heat the middle portion of the sleeve before the ends, and makes it near impossible to apply even, consistent heat throughout the area to be heated, to accurately control the amount of heat applied to different areas to be shrunk, or to accurately control the order in which the various areas are to be heated. Often, in order to obtain proper adhesion of the sleeve, it is required to maintain a minimum preheat temperature of the substrate, usually steel pipe and the mainline coatings on the pipe sections adjacent to the joint. Even when fewer area is to be heated, or where less torches are employed, certain areas, for example, the mainline coating adjacent the opposite end of the pipe, tends to have cooled below the minimum preheat temperature, so that the sleeve does not bond thereto. Therefore during the shrinking operation, extra prolonged heat has to be applied to sleeve area overlapping onto the mainline coating in order raise the adhesive-mainline coating interface to sufficient temperature to achieve a sound bond. With the flame torches, this is difficult as prolonged heating can scorch and damage the sleeve, and sometimes lead to splitting. The need for the extra prolonged heating is exacerbated by the fact that during the preheating of the joint, the mainline coating surface maybe 40° C.-100° C. cooler than the adjacent steel, as described earlier. Therefore, focused prolonged heating is imperative to achieve a good bond on the overlap coating.

Similar considerations should be taken into account when pre-heating a pipe joint prior to film or tape wrapping, or injection moulding.

U.S. patent Ser. No. 13/230,258, filed Mar. 12, 2010, and incorporated therein by reference, describes an apparatus for heating an elongate tubular article, and/or for heating a heat shrinkable sleeve applied around an elongate tubular article. The apparatus comprises a frame member adapted to be disposed around said article, the frame member provided with a heater device adapted to heat the article and/or the sleeve surrounding said article. The patent also describes a controller for operating the heater device. Ser. No. 13/230,258 teaches that the heater device can comprise two or more independent heater portions adapted to heat respectively two or more distinct longitudinally spaced zones of the sleeve, and the controller is able to operate the heater portions simultaneously or sequentially, and/or at different heating intensities/wavelengths/temperatures. The heater device therein described can comprise two or more regions of different diameters, to better conform to an elongate tubular article of varied diameter.

The heating elements used in such a device are taught to be any known form of heating element, including, in certain embodiments, infrared electrical elements, such as Unitube heaters available from Casso-Solar Corporation, Pomono, N.Y., United States of America. These infrared elements may be in the form of, for example, quartz tubes or ceramic tiles. Alternatively, they may comprise diffused gas combusting devices, powered for example by propane or natural gas. Examples of these include gas catalytic heaters available from Casso-Solar and from CCI Thermal Technologies, Edmonton, Alberta, Canada. Further examples include burners comprising metallic or ceramic matrixes that diffuse the flame and then radiate the heat outwards, such as Fibergas-II™ heaters, again from Casso-Solar, and heaters using gas diffused through perforated ceramic matrices, as supplied by Infragas S.p.a., Caselle Torinese, Italy.

U.S. Ser. No. 13/230,258 teaches, in certain embodiments, the use of thin film or otherwise flexible infrared electrical elements are used (also called "foil", or "flexible ribbon" heating elements). Examples of such elements include the V-series medium wavelength infrared panel heaters available from Casso-Solar Corporation, Pomona, N.Y., United States of America, as well as strips, sheets, planar thin foil heaters, corrugated ribbon foil, carbon loaded film, metal film photo patterned with runs of graphite material, conductive material sprayed or doctor bladed on a support medium, expanded metal, or wire resistive elements, such as sinuated wire. Stamped thin metal sheets having low mass for fast heating/cooling and minimal thermal lag, which can be attached to a high temperature insulation board having low thermal conductivity, low thermal mass and low heat capacity to minimize stored heat, are one such example. The patent teaches that thin film elements can be mounted on a high temperature insulating material and/or onto refractory insulating material in a variety of configurations, including linear, sinusoidal, or other configurations, as required or desired by the heating configuration and sequence, and that the use of such thin film or otherwise flexible heating element has numerous advantages, including: facilitating the manufacturing of the apparatus in varying shape and size, to tightly conform to the area to be heated; allowing customization of apparatus size and shape; tapering of the shape of the device to account for the difference in radius of the uncoated pipe such as the pipe proximal to the pipe joint and the radius of the mainline coating; all allowing for an improved and more even heat distribution along the various areas to be heated, and avoidance of the problems of burning or splitting of the sleeve.

U.S. Ser. No. 13/230,258 teaches that, by using stamped thin metal strips, different areas can be heated to different temperatures or at different time periods within the heat shrinking process, simply by having separate heating elements applied to different areas of the apparatus, and having each of these separate heating elements controlled individually by the controller. The different heating elements may be individually thermostatically controlled by the controller, and/or may have different heating characteristics (for example, made of different substrates or having a different coil thickness) to enable the variation in heating. However, the patent only teaches the use of such separately and individually controlled heating elements in a longitudinal orientation, for example, to shrink down the middle zone of the sleeve before the end zones, avoiding air entrapment, and permitting heating the areas of bare pipe to a higher heat level than the areas of coated pipe, thus preventing damage to the pipe coating while providing the bare pipe with optimal heat.

BRIEF DESCRIPTION OF THE DRAWINGS

Preferred embodiments are described with reference to the accompanying drawings, wherein like reference numerals indicate like parts.

FIG. 24 shows, schematically and in perspective view, a portion of the apparatus of yet another embodiment of the present invention.

FIG. 26 a-d show, schematically and in four different views, a frame for vertical applications in accordance with the present invention.

SUMMARY OF THE INVENTION

Figure 1:
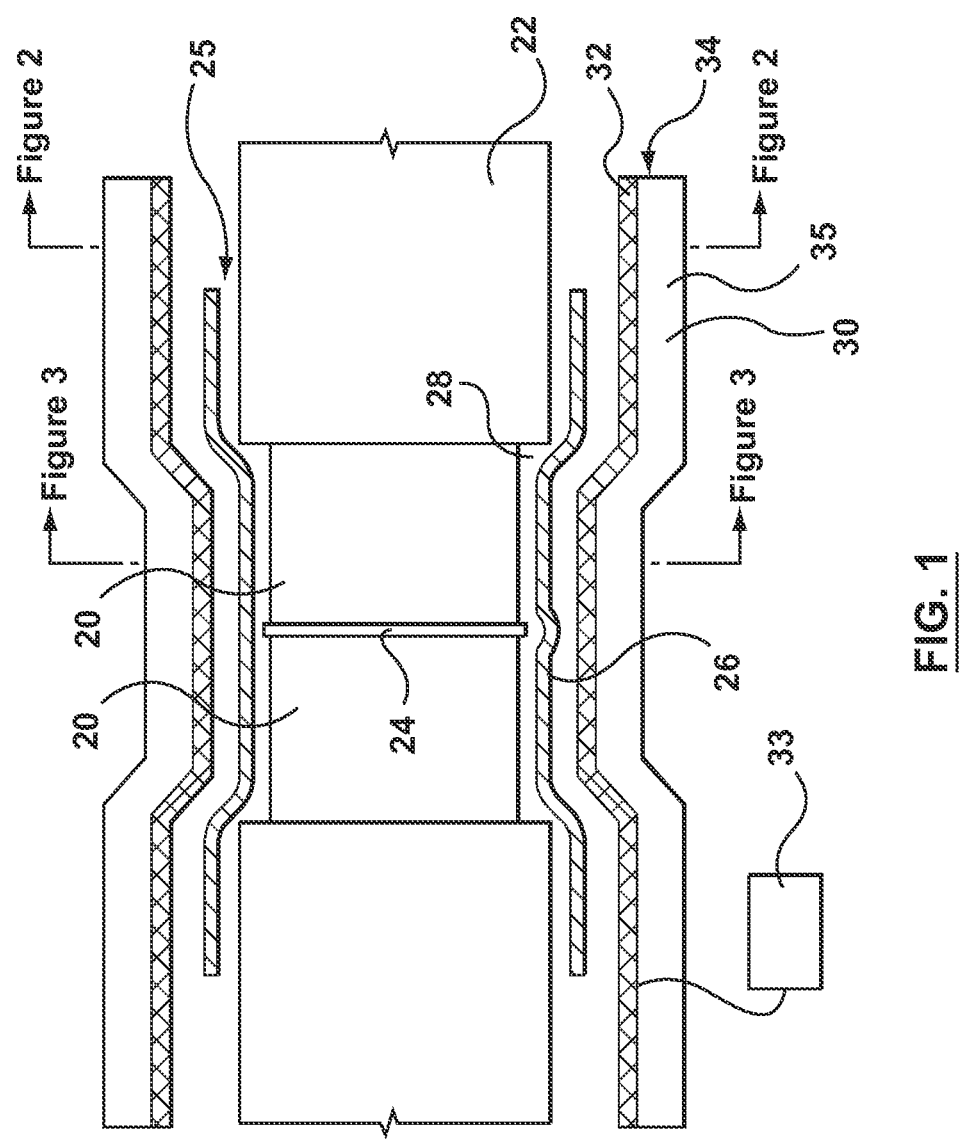
FIG. 1 shows schematically a longitudinal cross-section through a pipe joint on which is applied a first embodiment of apparatus in accordance with the invention.

According to one aspect of the present invention is provided an apparatus for heating an elongate tubular article and/or a heat shrinkable sleeve applied around the elongate tubular article, comprising a frame member adapted to be disposed around said article and/or sleeve, said frame member having a heater device adapted to heat the elongate tubular article and disposed on or proximal to an inner surface of said frame member, and a controller for operating the heater device; the said heating device having two or more longitudinally disposed heating zones and two or more radially disposed heating sectors.

In certain embodiments, the heater device comprises a plurality of heating panels mounted on said frame member.

According to yet a further embodiment, each of the plurality of heating panels defines a zone and a sector.

According to yet a further embodiment, the heating panels are infra red heating panels.

According to yet a further embodiment, the heating panels comprise a heating element layer and an insulating/reflecting layer.

According to yet a further embodiment, the heating panels are radially adjustable to provide an adjustable inner radius.

According to yet a further embodiment, the frame member comprises two clam shell halves, connected by a hinge, and having a line of contact opposing said hinge, such that, in an open position, the halves are spaced sufficiently apart to allow the frame member to be placed over the elongate tubular article, and, in a closed position, the halves abut or oppose adjacent one another at the line of contact.

According to yet a further embodiment, the frame member comprises a three piece clam shell design, having a first, top portion, and two wings, each connected to the top portion by a hinge, and having a line of contact opposing said hinge, such that, in an open position, the wings are placed sufficiently apart to allow the frame member to be placed over the elongate tubular article, and, in a closed position, the wings abut or oppose adjacent one another at their respective line of contact.

According to yet a further embodiment, the apparatus further comprises a shock absorber at the line of contact.

According to yet a further embodiment, the apparatus further comprises a rough locator or guide for aiding in aligning the apparatus wings or halves when closing around a pipe.

In a further embodiment is provided an apparatus for heating an elongate tubular article and/or a heat shrinkable sleeve applied around the elongate tubular article, comprising a frame member adapted to be disposed around said article and/or sleeve, said frame member having a heater device adapted to heat the elongate tubular article and disposed on or proximal to an inner surface of said frame member, and a controller for operating the heater device; further comprising an air circulation system.

According to yet a further embodiment, the air circulation system comprises an air tube connected to an air supply and running a longitudinal length of the apparatus, said air tube configured to dispel air provided from said air supply along said length, between the apparatus and the article and/or sleeve when disposed around said article and/or sleeve.

According to yet a further embodiment, the air tube comprises a plurality of small orifices for dispelling the air.

According to yet a further embodiment, the air supply is a hot air supply.

In a further embodiment, the apparatus further comprises a shield on each end of said apparatus, configured so that, in use, the shield substantially closes a gap between the apparatus and the article.

In certain embodiments, the shield comprises a plurality of flaps. In certain other embodiments, the shield comprises a continuous band.

According to yet a further embodiment, the shield is flexible.

According to yet a further embodiment, the shield is made from a heat resistant material selected from glass cloth and sheet metal.

According to yet a further embodiment, the apparatus further comprises an exhaust vent.

According to yet a further embodiment, the apparatus further comprises a smoke detector sensor.

According to yet a further embodiment, the apparatus further comprises an adhesive collector.

According to yet a further embodiment, the adhesive collector comprises a plurality of wire mesh strips positioned near the bottom, interior edges of the apparatus when in use.

According to yet a further embodiment, the wire mesh strips have a mesh orifice size greater than 1 mm×1 mm.

According to yet a further embodiment, the apparatus further comprises a water and dust tight casing.

According to yet a further embodiment, the frame member is adjustable for varying the width of the apparatus, and for affixing panels of varying width.

According to yet a further embodiment, the apparatus further comprises a brake system.

According to yet a further embodiment, the brake system comprises a plurality of springs affixed to the frame member and positioned to lie between the frame member and the article, and a plurality of pads, each affixed to the opposing end of the spring and configured to rest on the article when the apparatus is disposed around said article.

According to yet a further embodiment, the apparatus further comprises a data storage device, and a digital camera configured to take a picture of the article and having the ability to transmit the data to a remote location.

According to yet a further aspect of the invention is provided a spacer comprising a body, an arm, and a handle, and a spacer array comprising a plurality of spacers, connected by a curved rod.

According to yet a further aspect of the invention is provided a frame for holding the apparatus of any one of the preceding claims in a vertical position, said frame having a mounting bracket for affixing to the frame member of the apparatus, and a mounting bar for attaching a robotic arm, telescopic rod, or scissor jack.

A further aspect of the present invention is a kit comprising the apparatus as herein described, and the frame as herein described.

According to yet a further aspect of the present invention is provided a clamp for positioning a heat shrinkable sleeve on a substantially vertically oriented elongate tubular article, said clamp comprising a band for clamping onto the elongate tubular article, a plurality of vertical legs extending from the band in the direction of the desired location of the sleeve, a tongue at the end of each of the vertical legs, vertical lips at the end of each tongue opposing the vertical leg.

A further aspect of the present invention is a kit comprising the apparatus as herein described, and the clamp as herein described. The kit may also include the frame as herein described, or any two of the three.

According to yet a further embodiment of the present invention is provided a method for shrinking a heat shrinkable sleeve to a substantially horizontally oriented elongate tubular article, said sleeve having a top area and a bottom area, utilizing an apparatus as herein described, comprising: positioning the heat shrinkable sleeve onto the elongate tubular article to envelop the article circumferentially; enveloping the sleeve with the apparatus; activating the heater device on said apparatus to heat said sleeve, thus shrinking said sleeve to said elongate tubular article; wherein the bottom area is heated to a higher heat intensity and/or for a longer period of time than the top area.

According to yet a further embodiment of the present invention is provided a method for shrinking a heat shrinkable sleeve to an elongate tubular article, utilizing an apparatus as herein described, comprising: wrapping the heat shrinkable sleeve onto the elongate tubular article to envelop the article circumferentially and to form a wrap area and an overlap area; enveloping the sleeve with the apparatus; activating the heater device on said apparatus to heat said sleeve, thus shrinking said sleeve to said elongate tubular article; wherein the overlap area is heated to a higher heat intensity or for a longer period of time than the wrap area.

According to yet a further embodiment of the present invention is provided a method for shrinking a heat shrinkable sleeve to an elongate tubular article, utilizing an apparatus as herein described and having an air supply as herein described, comprising: positioning the heat shrinkable sleeve onto the elongate tubular article to envelop the article circumferentially; enveloping the sleeve with the apparatus; activating the heater device on said apparatus to heat said sleeve, thus shrinking said sleeve to said elongate tubular article; and simultaneously dispelling air from the air supply.

According to yet a further embodiment of the present invention is provided a method for shrinking a heat shrinkable sleeve to an elongate tubular article, utilizing an apparatus as herein described and having an air supply as herein described, comprising: positioning the heat shrinkable sleeve onto the elongate tubular article to envelop the article circumferentially; enveloping the sleeve with the apparatus; repeatedly alternating between activating the heater device on said apparatus to heat said sleeve, and dispelling air from the air supply to cool said sleeve.

According to yet a further embodiment of the present invention is provided a method for shrinking a heat shrinkable sleeve to a generally vertically oriented elongate tubular article, comprising: clamping a clamp as herein described to the elongate tubular article in a position directly below where it is desired to shrink the heat shrinkable sleeve; positioning the heat shrinkable sleeve onto the elongate tubular article to envelop the article circumferentially, such that the heat shrinkable sleeve rests on the tongue of the clamp, and such that the sleeve has a top area, most distal from the clamp, bottom area most proximal to the clamp, and a middle area between the bottom area and the top area; activating the zones of the heating device most proximal to the middle area and optionally most proximal to the top area to shrink said middle area and optionally said top area; removing the clamp; activating the remaining zones of the heating device.

According to yet a further embodiment of the present invention is provided a method for shrinking a heat shrinkable sleeve to a generally vertically oriented elongate tubular article, comprising: positioning the heat shrinkable sleeve onto the elongate tubular article to envelop the article circumferentially, such that the heat shrinkable sleeve has a top area, a bottom area, and a middle area between the bottom area and the top area; activating the zones of the heating device most proximal to the bottom area to shrink said bottom area; activating the zones of the heating device most proximal to the middle area to shrink said middle area; activating the zones of the heating device most proximal to the top area to shrink said top area.

According to yet a further embodiment of the present invention is provided a method for shrinking a heat shrinkable sleeve to an elongate tubular article utilizing an apparatus as herein described, comprising: pre-warming the heater device on said apparatus; positioning the heat shrinkable sleeve onto the elongate tubular article to envelop the article circumferentially; enveloping the sleeve with the pre-warmed apparatus; activating the heater device on said apparatus to heat said sleeve, thus shrinking said sleeve to said elongate tubular article.

According to yet a further embodiment of the present invention is provided a method for shrinking a heat shrinkable sleeve to an elongate tubular article utilizing an apparatus as herein described, comprising: pre-warming the sleeve to an elevated temperature; positioning the heat shrinkable sleeve onto the elongate tubular article to envelop the article circumferentially; enveloping the sleeve with the apparatus; activating the heater device on said apparatus to heat said sleeve, thus shrinking said sleeve to said elongate tubular article.

According to yet a further embodiment of the present invention is provided a method for shrinking a heat shrinkable sleeve to an elongate tubular article utilizing an apparatus as herein described and having an air supply as herein described, comprising: positioning the heat shrinkable sleeve onto the elongate tubular article to envelop the article circumferentially; enveloping the sleeve with the apparatus; pre-warming the sleeve with hot air dispelled from the air supply; activating the heater device on said apparatus to heat said sleeve, thus shrinking said sleeve to said elongate tubular article.

DETAILED DESCRIPTION

Referring firstly to FIG. 1, this shows schematically a frame apparatus 34 providing a generally cylindrical support structure 35. The apparatus 34 is disposed around a cylindrical heat shrink sleeve 26 applied on an elongate tubular article, for example a joint 25 comprising a weld 24 between the bare ends of pipe sections 20, each having a polymeric protective mainline coating 22.

The support structure 35 carries a heater device comprising in this example heating element layer 32. The support structure 35 also has an insulating/reflecting layer 30, which reflects heat emitted from heating element layer 32 and insulates the exterior of the support structure 35. The insulating/reflecting layer 30 may be made of any material known in the art to have heat reflection or insulating properties, for example, an insulating foam or a refractory material.

In a preferred form, as seen in FIG. 1, the support structure 35 and heating element layer 32 span the entire length of the sleeve 26 and joint 25, extending beyond the bare ends of pipe sections 20 onto a portion of mainline coating 22.

A controller 33, which may be (as shown) separate from support structure 35 or which may be integrated within it, controls the level and/or intensity of heat output from heating element layer 32. The controller 33 may be thermostatically controlled, may be controlled through the measurement of resistance in heating element layer 32, may be a timer, or may simply be an operator —selected switch.

In the example illustrated in FIG. 1, there is one uniform heating element layer 32, which extends around the inner side of substantially the entire support structure 35.

Figure 17:
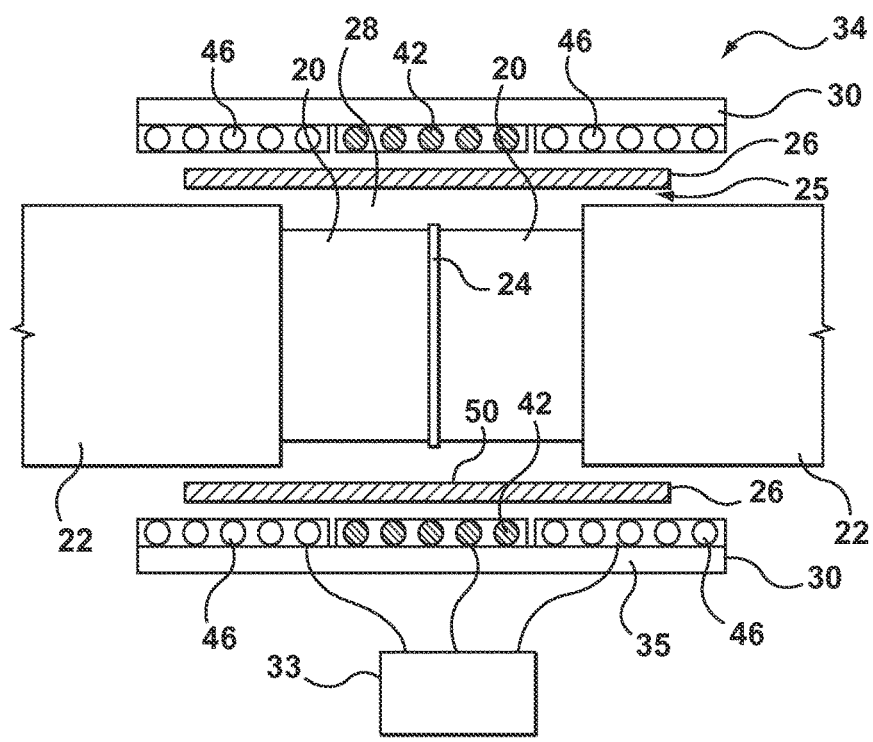
FIGS. 17, 18 and 19 show schematically a longitudinal cross-section illustrating a further embodiment in accordance with the present invention.
Figure 18:
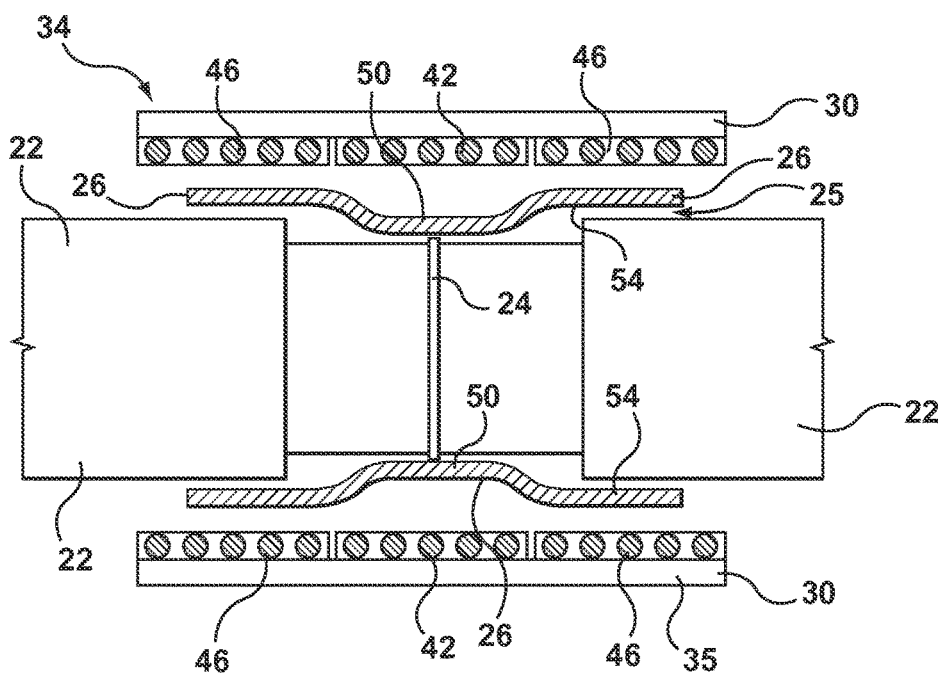
Figure 19:
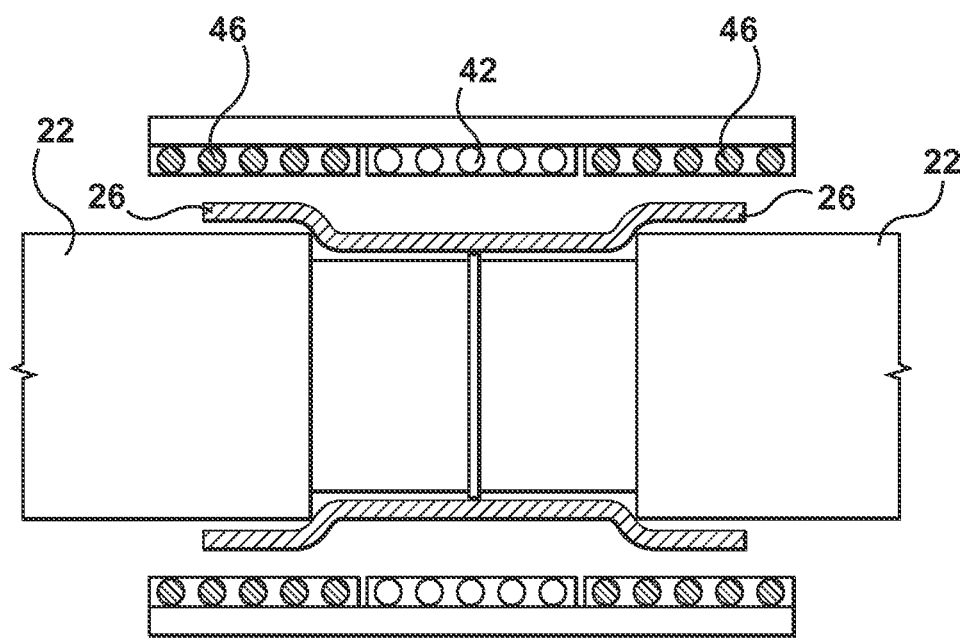

In the example illustrated in FIG. 1, the support structure 35 is tapered in the middle, and closely follows the radius of the pipe through its bare pipe sections 20 and mainline coating 22. In this manner, the distance between sleeve 26 and heating element layer 32 can be made more consistent, allowing for an improved and more even heat distribution along the various areas to be heated. This improved and more consistent proximity may thus permit even closer control of the heating of the joint for preheating purpose, and also better control of shrinking operation of shrink sleeves, thus avoiding problems of burning or splitting of the sleeve. However, this is an optional embodiment; as shown in FIGS. 17-19, for example, the support structure is not tapered in the middle.

Figure 2:
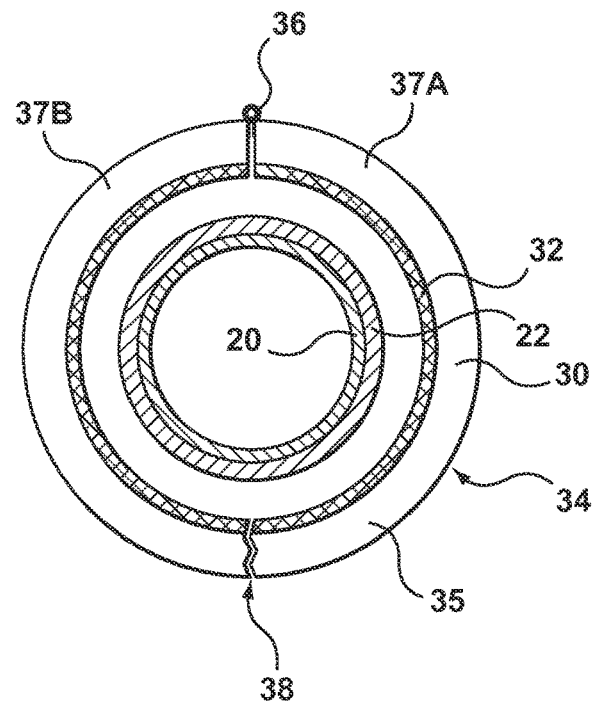
FIG. 2 shows schematically a transverse cross-section through the pipe joint of FIG. 1, said traverse cross-section taken at plane A as shown on FIG. 1.
Figure 3:
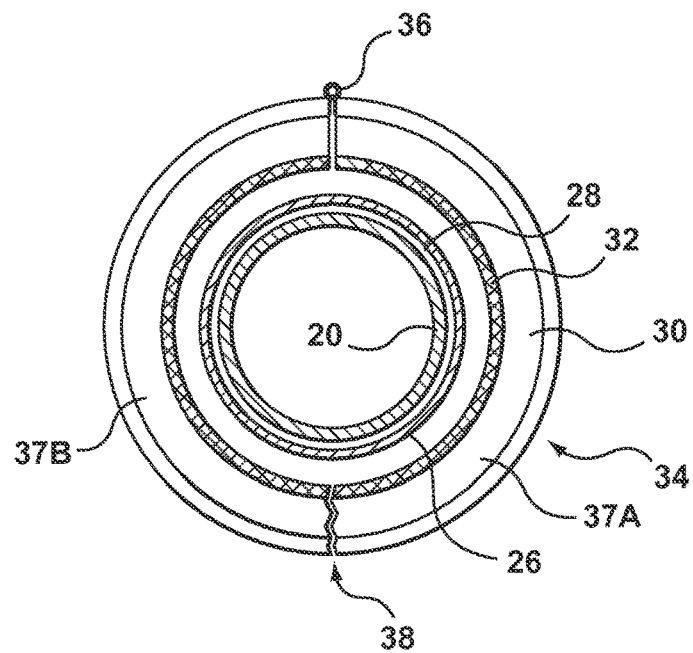
FIG. 3 shows schematically a transverse cross-section through the pipe joint of FIG. 1, said transverse cross-section taken at plane B as shown on FIG. 1.

In certain forms, the support structure 35 comprises a clam shell device as seen in FIGS. 2 and 3, having a hinge 36 extending longitudinally along one side. In a closed position, as seen in FIGS. 2 and 3, halves 37a and 37b abut or oppose adjacent one another at edges opposite the hinge 36, along a line of contact or opposition 38. The halves 37a and 37b can be pivoted from the closed position as seen in FIGS. 2 and 3 to an open position wherein the edges of halves 37a and 37b are spaced apart sufficiently to allow the open clam shell to be placed over the assembly of the sleeve 26 and pipe joint 25. The halves 37a and 37b are then closed together to commence the pre-heating or shrinking operation.

Figure 4:
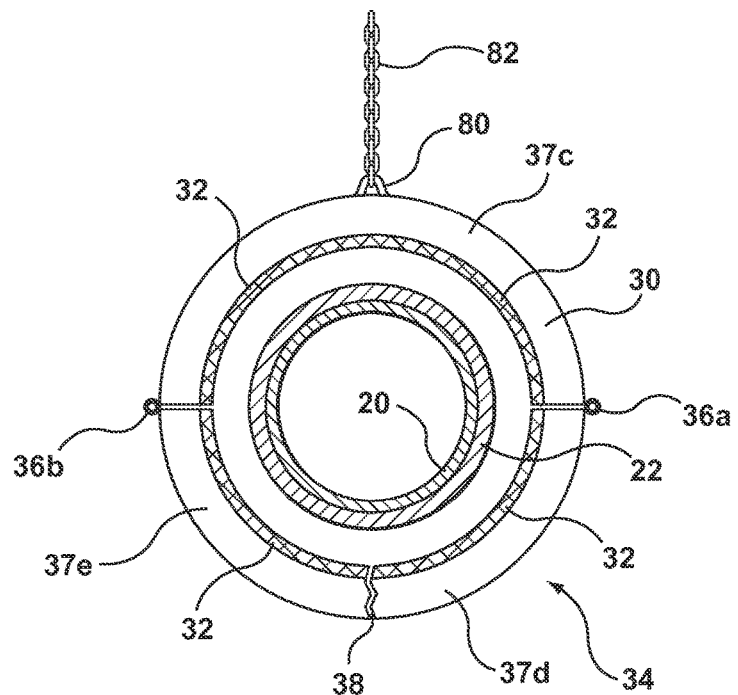
FIG. 4 shows schematically a transverse cross-section of a further embodiment of the apparatus in accordance with the invention, surrounding a pipe joint.
Figure 5:
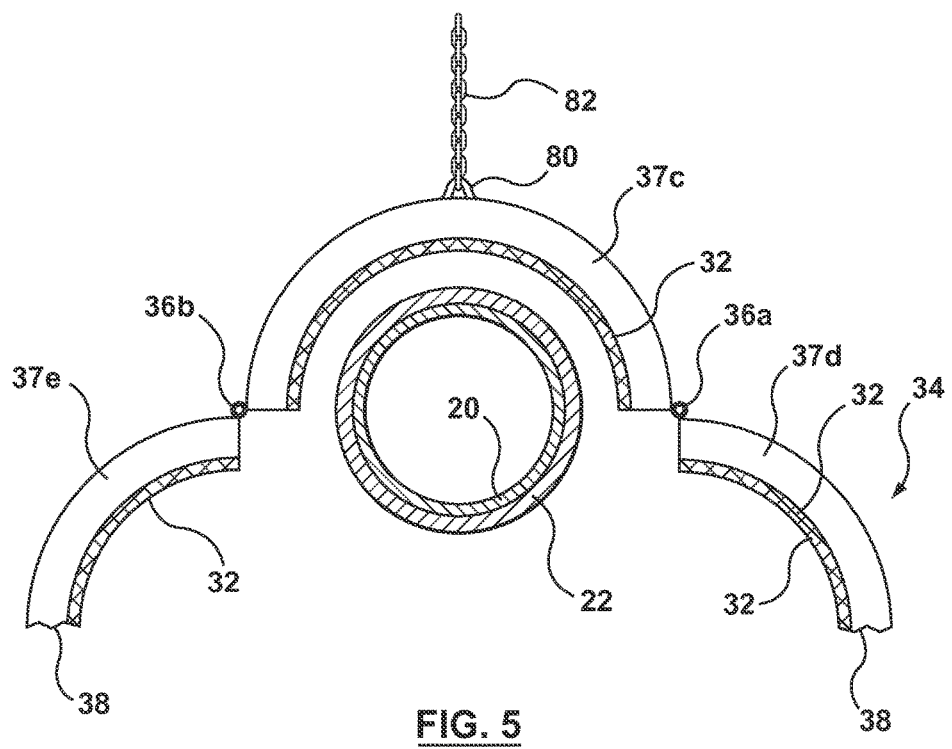
FIG. 5 shows schematically a transverse cross-section of the apparatus of FIG. 4, in an open configuration.

In other embodiments, the support structure 35 comprises a three piece clamshell design, as shown in FIGS. 4 and 5. This three piece clamshell design was found to be better than the two piece design for large structures (i.e. for use on large pipes), since the three piece clamshell design is better for lifting the apparatus on and off the pipe utilizing a hook at the 12 o'clock position (i.e. at the top of the support structure 35 as it is placed on a generally horizontal pipe section). In this design, wings 37d, 37e can be placed in an open position (as seen in FIG. 5) for placement of the support structure 35 onto the generally horizontal pipe section. The support structure 35 can rest on the pipe with the wings 37d, 37e in either an open or closed position. Wings 37d, 37e can then be closed (as seen in FIG. 4) for heating the pipe section. Wings 37d, 37e can be opened and closed manually, or by using pneumatic or hydraulic pistons (not shown), or by using a motorized jack (not shown) mounted on the support structure 37c. Where there are pneumatic, hydraulic or motorized systems for opening or closing the wings, it is advantageous to also have lifting points for manual opening/closing of the wings—in the even that the automated and/or motorized system fails in the field, it is important to be able to override it with manual systems. Therefore, even when motorized or hydraulic systems are in place, tow points are provided, for example, by way of a hook, where straps can be attached to open the wings, as shown in FIG. 6.

Figure 6:
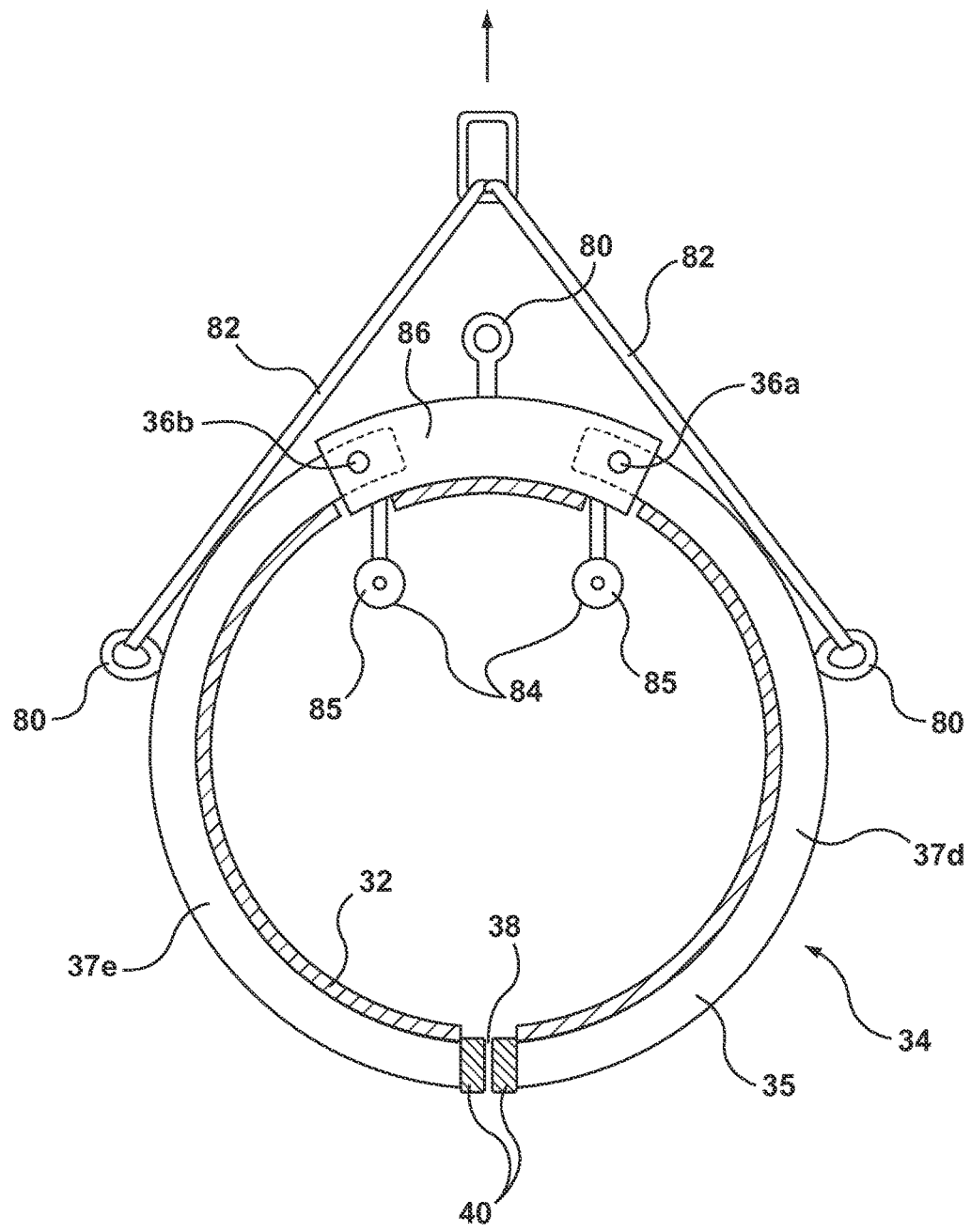
FIG. 6 shows schematically a transverse cross-section of yet a further embodiment of the apparatus in accordance with the invention.

As shown in FIG. 6, support structure 35 can be displaced using a strap, cable or chain 82, fastened by a hook (not shown) to eyelet 80.

FIG. 6 shows a further variant of the support structure 35. This is also a three piece design, with support frame 86 connected, via hinges 36a, 36b, to wings 37d and 37e. The support structure 35 can be raised and lowered onto a pipe (not shown) utilizing chain 82 fastened by hooks (not shown) to eyelets 80. Also shown in this figure, support frame 86 comprises support spacers 84, which extend from the support frame 86 in the direction of the pipe (not shown). Support spacers 84 ensure there is a desired distance between the support structure 35 and the pipe. Support spacers 84 can be adjustable, for example, utilizing set points so that the distance from the support frame 86 to the support spacers 84 can be adjusted upwards or downwards, to make adjustments easier and more precise, and to adjust the gap between the apparatus and the pipe, desirable when using on pipes of different diameter. The support spacers 84 can have wheels 85 affixed at their end, this facilitates the movement of the apparatus longitudinally on the pipe. Also shown in FIG. 6 are shock absorbers 40 which cushion the wings when closing. Rough locators or guides, such as spring-mounted guides (not shown) may also be affixed to the apparatus, typically at the end of the wings 37d, 37e close to line of contact 38, to aid in aligning the apparatus wings when closing around a pipe 20.

Figure 7:
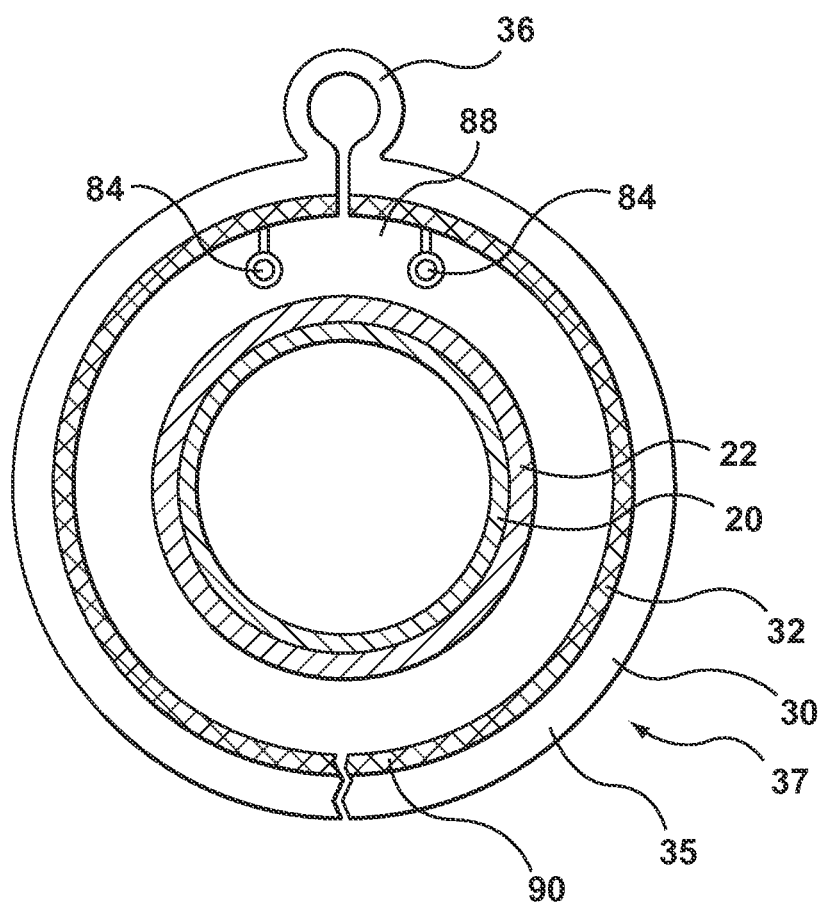
FIG. 7 shows schematically a further transverse cross-section of yet a further embodiment of the apparatus in accordance with the invention.

FIG. 7 shows a support structure 35 similar to that shown in FIG. 2, in a further embodiment of the present invention. Here, the support structure 35 comprises the support spacers 84 as described in the embodiment of FIG. 7. It has surprisingly been found that, when in use, when the device heating panels were designed to provide uniform heat around the circumference, and the sides of the device were shielded to create an "oven-like" uniform temperature atmosphere, it was found that the bottom portions of the pipe (for example, the 5 to 7 o'clock positions) remained cooler than the top of the pipe. This temperature differential was undesirable, since it led to a less than uniform shrinking and application of the heat shrinkable sleeve around the pipe. This was thought to occur for a variety of reasons: during shrinking of the sleeve, it was found that some smoke was generated, and venting was provided near the top of the apparatus. Thus, the heat and smoke would rise, causing a temperature differential between the bottom of the pipe and the top of the pipe, despite the uniform heat provided by the heating panels around the circumference of the apparatus. The inventors also found that minor amounts of uneven spacing between the apparatus and the pipe and/or heat shrinkable sleeve surprisingly led to a significant and unoptimal heating differential around the full circumference. Thus, as shown, to combat this problem, the support structure 35 can be designed so that the top gap 88 between the support structure 35 (and accordingly the heating element 32) and the pipe mainline coating 22 at the 12 o'clock position is larger than the bottom gap 90 between the support structure 35 and the coating 22 at the 6 o'clock position. As shown, this is done through adjustment of support spacers 84. In this way, the heating element 32 at the bottom portions of the pipe are closer to the pipe than at the top portions of the pipe, correcting for the temperature differential described above.

Figure 8:
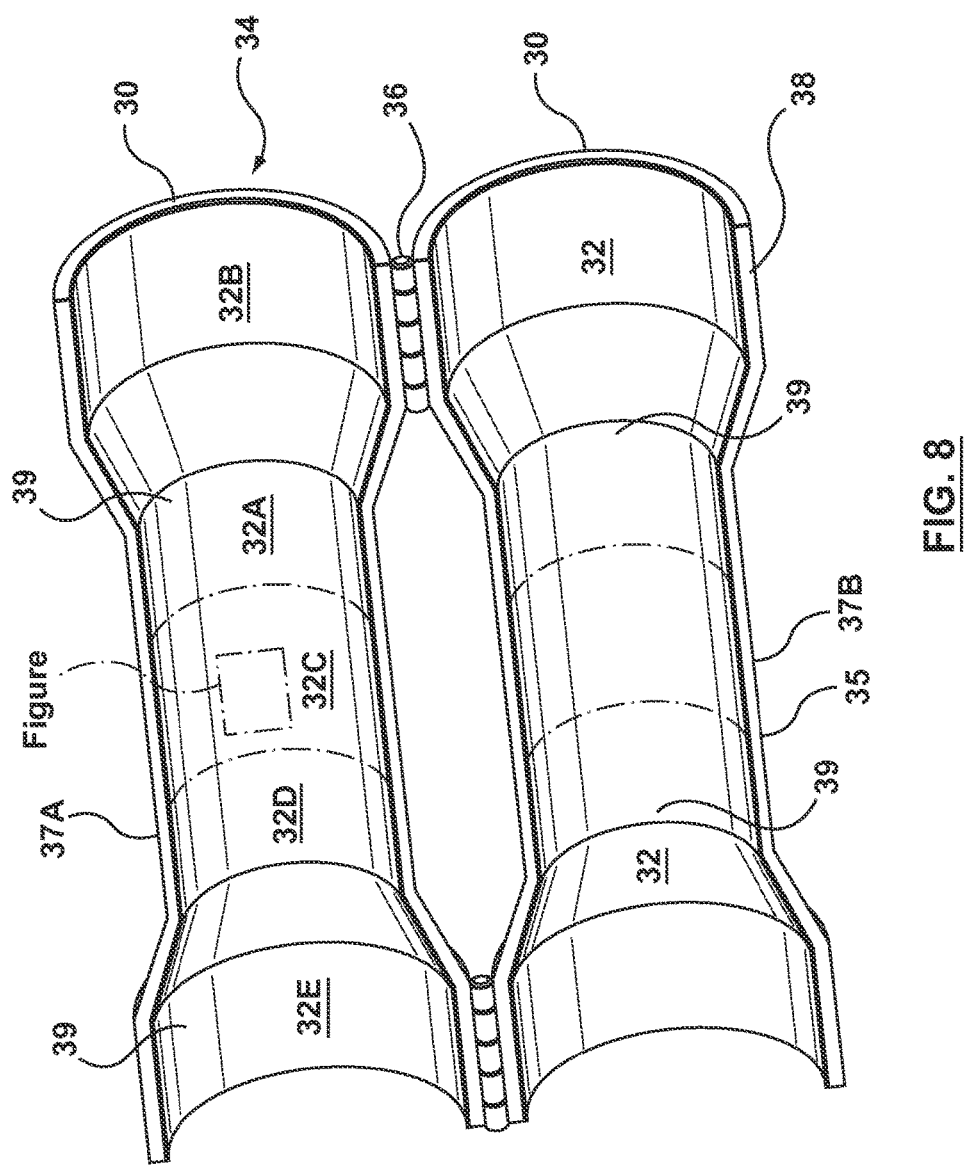
FIG. 8 a perspective view illustrating a further embodiment of apparatus in accordance with the invention, shown in an open position with the inside surface exposed.
Figure 9:
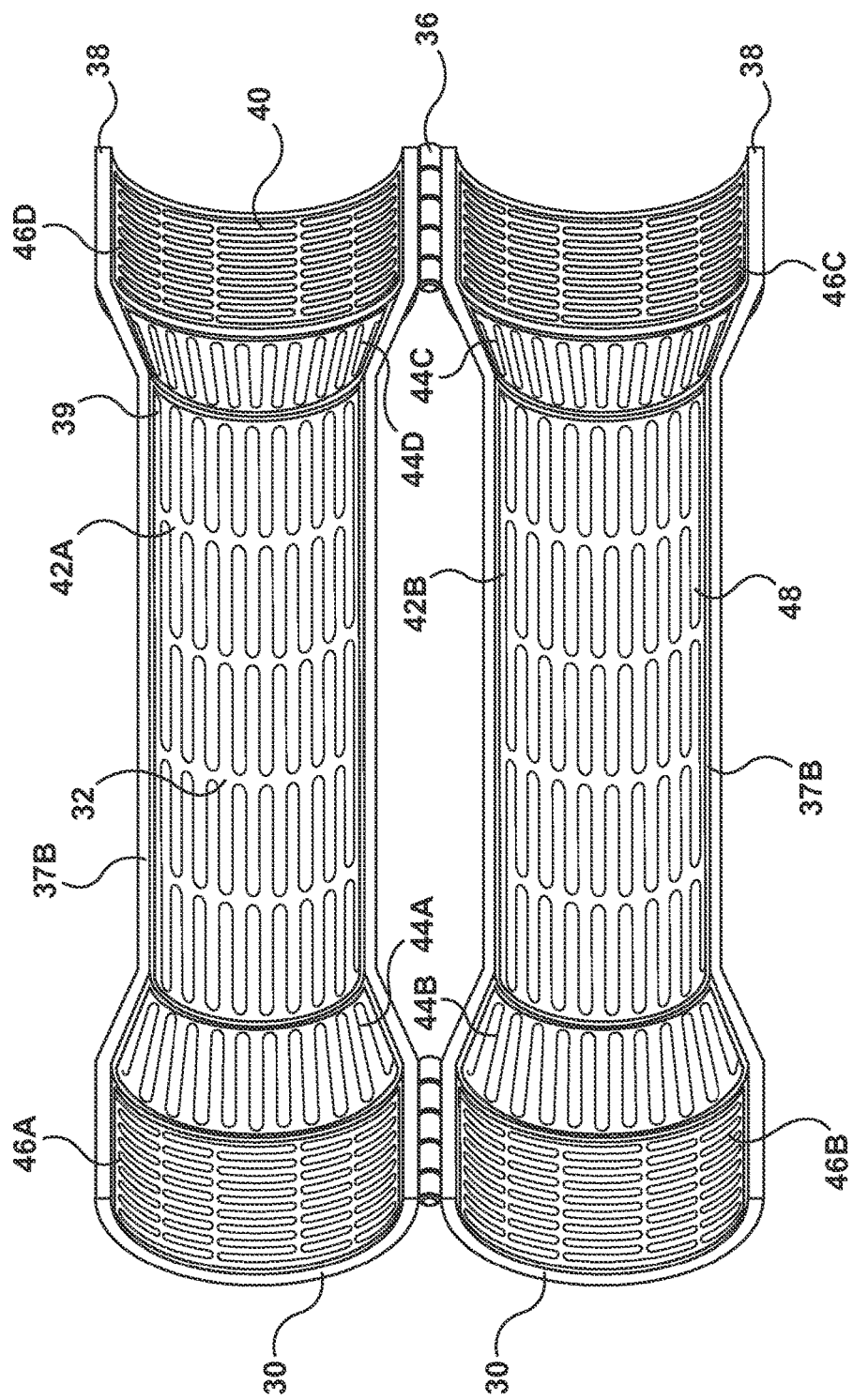
FIG. 9 shows a perspective view illustrating a third embodiment of an apparatus in accordance with the invention, shown in an open position with the inside surface exposed.

FIG. 8 shows a support structure 35 in an open position. The halves 37a and 37b are shown open, with the inner surface 39 of the support structure 35 exposed. Heating element layer 32 spans the entire length and breadth of the inner surface 39, though it may be divided into segments such as segments 32a-e as shown for half 37a. In certain embodiments, the heating element layer 32 is a thin film or otherwise flexible heating element, such as a flat foil conductor circuit, or a stamped foil element strip as shown in closeup C in FIG. 9, which shows a close-up (not to scale) of the sinusoidal shaped ribbon 48 of a preferred embodiment of the heating element layer 32. The sinusoidal shaped ribbon 48 shown is approximately 3 mm wide and 1 mm thick, and curved or sinusoidal in shape to maximize surface area. The flexible, thin nature of the ribbon 48 allows for the heating element layer 32 to be three-dimensionally profiled such that it curves around support structure 35, maximizing the area and evenness of heating when it is applied to joint 25. Typically, the heating element layer 32 provides radiant infra-red energy at a wavelength of between 1 and 16 µm, for example, 2½ to 6 µm. The heating element layer 32 typically provides energy as both radiant infra-red radiation and "heat"; we have found that, for a polyolefin heat shrink sleeve, a wavelength of about 3.45 µm provides excellent results.

In one embodiment, the heating element layer 32 consists of thin circuit nickel chromium alloy wire sandwiched between a heat resistant polymer such as polyimide or polyester. Other embodiments comprise a heating element layer 32 made from chromium aluminum and iron alloy or nickel chromium and iron alloy. In one embodiment, the heating element layer 32 is a thin stamped sheet or foil having a chemical composition in percent by weight as follows: 0.02-0.10% C; 0-0.10% Mn; 19.5% Cr; about 56% Ni; 4.25% Mo; 0-2.0% Fe; 13.5% Co; 1.3% Al; 9.1% Cu; 0-0.15% Si; 0.003-0.01% B; and 3% Ti.

Figure 8A:
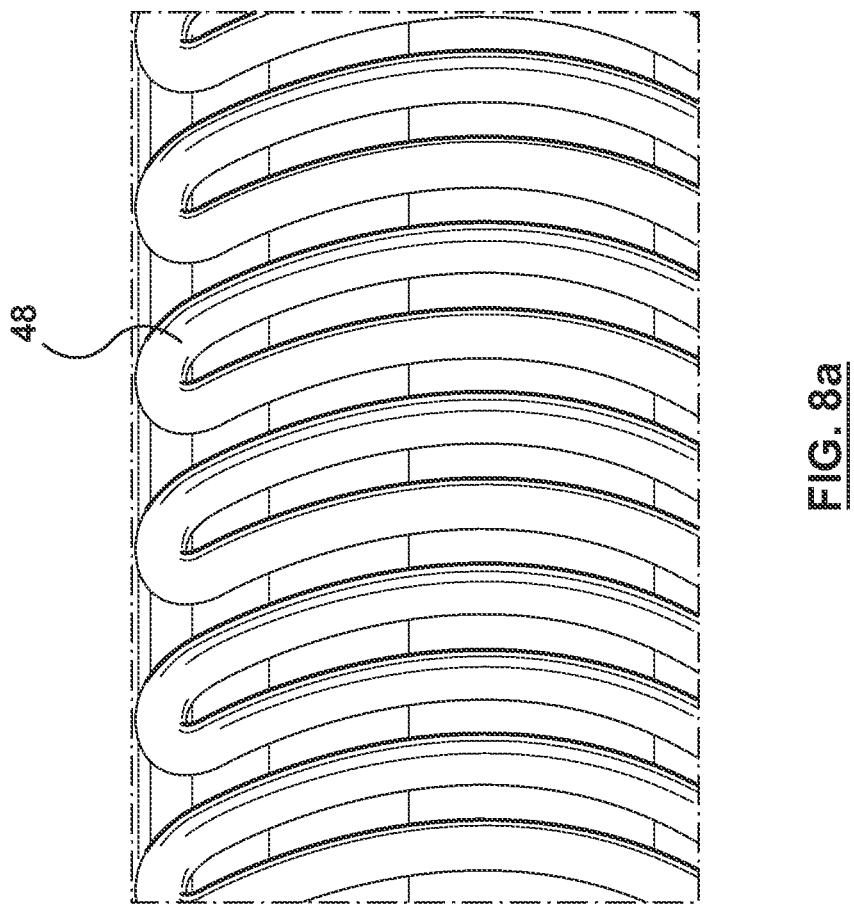
FIG. 8A shows a close-up of area C from FIG. 8, illustrating the surface of flexible heating elements that are an element of certain embodiments of the invention.

FIG. 8 is an illustration of support structure 35 in an open position. The halves 37a and 37b are shown open, with the interior of the support structure 35 (i.e. the area most proximal to pipe 20 when in use) exposed. Heating element layer 32 spans the entire length and breadth of the inner surface 39. FIG. 8a illustrates ribbon 48, though it would be understood to a person skilled in the art that the actual dimensions of ribbon 48 are typically much more densely packed, for example, a width of about 3 mm. In the embodiment shown in FIG. 9, heating element layer 32 is divided into ten different zones, each having a separate flexible heat film. Half 37a is divided into a center zone 42a, surrounded by transition zones 44a and 44d, each of which is, in turn, flanked by external zones 46a and 46d, respectively. Likewise, half 37b is divided into center zone 42b, surrounded by transition zones 44b and 44c, each of which is, in turn, flanked by external zones 46b and 46c, respectively. Each of the zones 42a, 42b, 44a, 44b, 44c, 44d, 46a, 46b, 46c, and 46d comprises a separate stamped foil element strips, which can be controlled separately by controller 33 (not shown in FIG. 9). Each of these zones may have specified number of these strips, more densely packed strips would emit more infra red waves and more heat output. Thus, the apparatus features ten separate heating areas, which can be independently set for different heat intensities and temperatures, or different times of heating. For example, when clamped around pipe joint 25, a heating sequence can be selected such that zones 42a and 42b heat first, thus heating the heat shrinkable sleeve 26 surrounding the exposed pipe 20. Second in the sequence, zones 44a, 44b, 44c, and 44d are activated, heating the transition areas. Optionally, center zones 42a and 42b may be switched off at this point in time. Third in the sequence, zones 46a-d would be activated, again, optionally switching off transition zones 44a-d, and, if still applicable, center zones 42a and 42b. In this manner, heat is applied starting in the middle of the heat shrink sleeve 26, then radiating outwards, which minimizes bubble formation and/or air pocket 28. Similar heat sequence would also follow for preheating of the joint whereby the zones 42a and 42b over the steel are set at higher intensity, and the zones 44a, 44b, 46a and 46b over the polymeric coating are set lower intensities, but for longer time to avoid oxidative damage to the coating.

Figure 10:
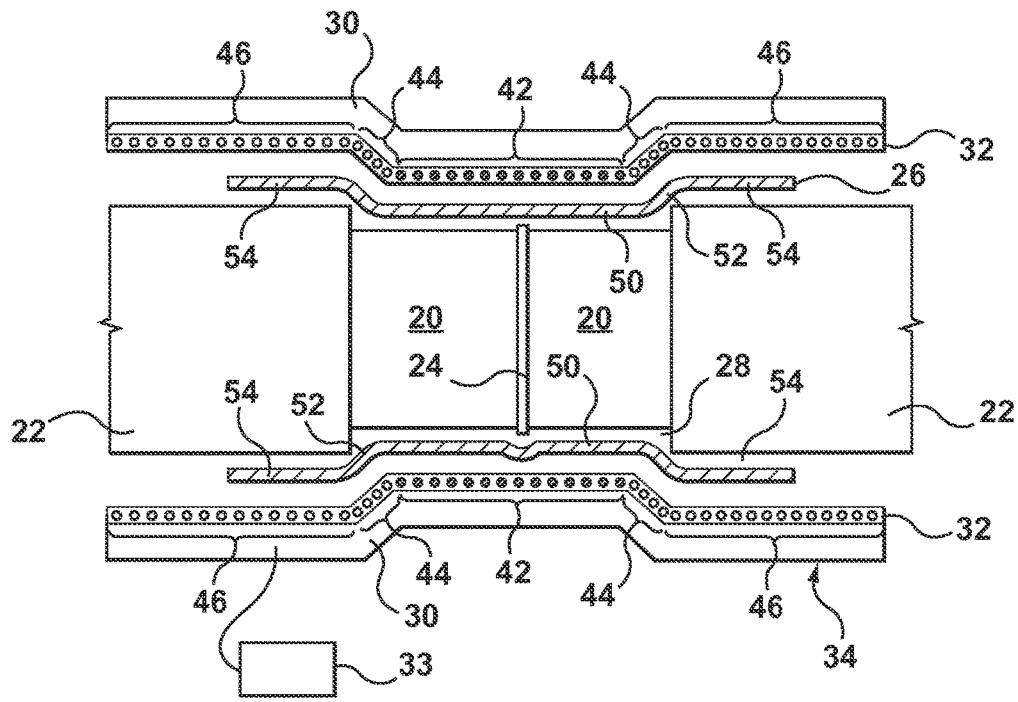
FIGS. 10, 11 and 12 show schematically a longitudinal cross-section illustrating the embodiment of FIG. 9 in successive stages of operation.
Figure 11:
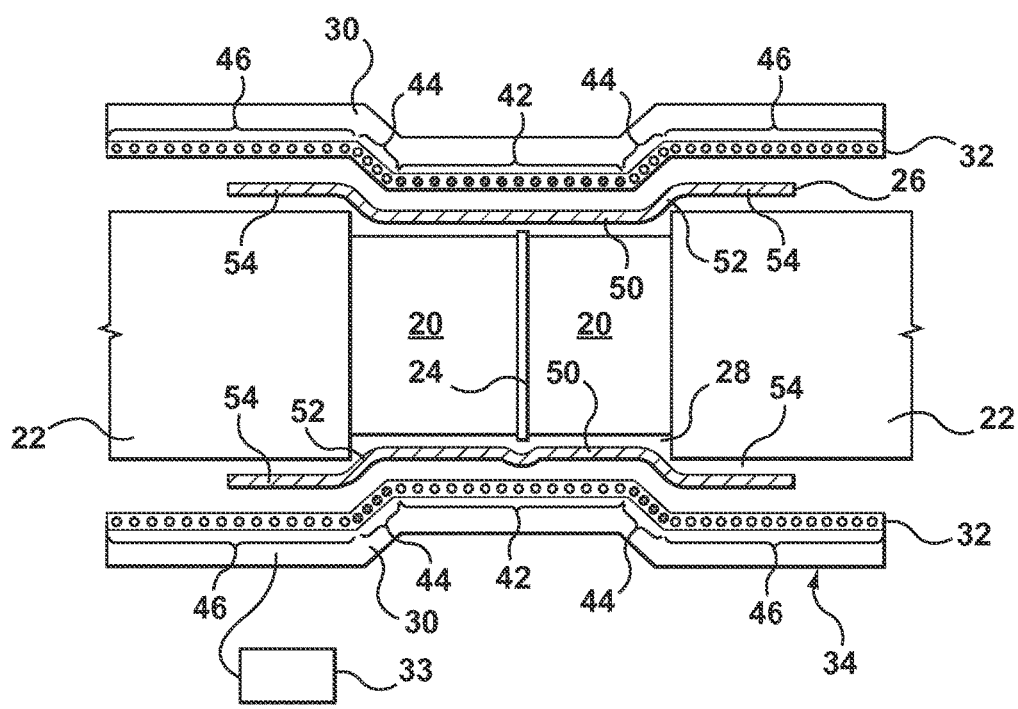
Figure 12:
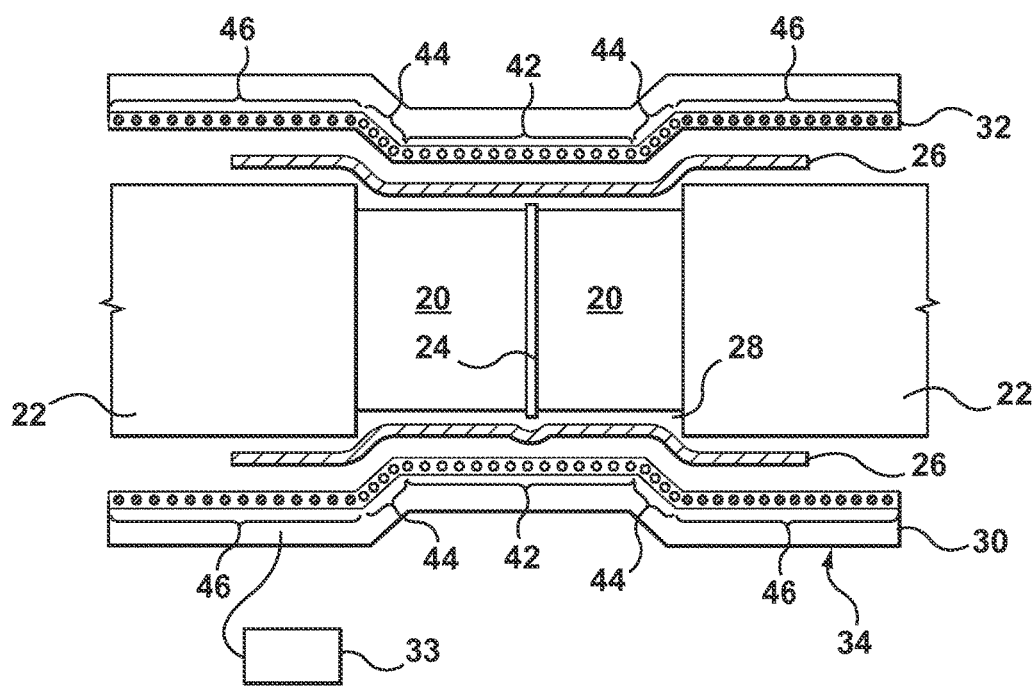

FIGS. 10-12 show the sequence as described above, in schematic form. In operation, the controller 33 is first actuated to operate solely the center zone 42 (comprising center zones 42a and 42b), at a desired heat output and for a period sufficient to cause a middle portion 50 of sleeve 26 to shrink onto the weld 24 and bare pipe ends 20, as seen in FIG. 7, which shows center zone 42 in black, denoting activation. The controller 33 is then actuated to operate transition zone 44 (comprising transition zones 44a, 44b, 44c, and 44d) at a desired heat output and for a period sufficient to cause a transition portion 52 of sleeve 26 to shrink onto the pipe 20 and the mainline coating 22. During this period of heating, depending on the application, center zone 42 may also be heated; alternatively and as shown in FIG. 11, only the transition zone 44 is heated. Finally, the controller 33 is actuated to operate external zone 46 (comprising external zones 46a, 46b) at a desired heat output and for a period sufficient to cause an outer portion 54 of sleeve 26 to shrink onto the mainline coating 22. During this period of heating, depending on the application, heating zone 42 and/or heating zone 44 may also be heated; as shown in FIG. 12, only the outer zone 46 is heated. Optionally, heating zones 42, 44 and 46 can be heated to different temperatures, and/or for different durations of time, depending on the preferred temperature and duration of heat required for the particular material comprising the pipe 20, pipe joint 25, or mainline coating 22. By providing heat starting at the center and moving in an outward direction, air pockets (for example, air pocket 28) between the pipe 20 and/or the mainline coating 22, and the heat shrink sleeve 26, are minimized, since air is expelled progressively from the annulus between the sleeve 26 and the pipe ends in the above stages.

Following completion of the shrinking, the halves 37a and 37b of the clam shell device are pivoted to the open position to facilitate moving the apparatus relative to the pipe, to align it with a further pipe joint, and the above described cycle of operation is repeated.

As will be appreciated, the apparatus may have any number of heat zones for any desired application. In addition, the controller 33 may be actuated manually or under the control of an automatic primary controller, optionally with pre-set temperature and timing for a selection of a variety of pipes, mainline coatings 22, and/or applications. For example, in some applications, the apparatus would be used for preheating a pipe 20, pipe joint 25, and mainline coating 22 following the welding of the pipe joint 25 and before the application of a film or tape wrapping or an injection moulding coating. In such applications, of course, sleeve 26 would be absent. In such applications, the controller may be pre-set for different temperatures for the different areas of the heating element. For example, the entire heating element may be set for a simultaneous 5 minute heating, but the center zone 42 would be set to heat at a much higher intensity and temperature than transition zone 44, which, in turn, would be set to heat at a higher intensity than external zone 46. In this manner, the pipe 20 and pipe joint 25 can be preheated to a desired temperature, while avoiding damage to mainline coating 22, which would be heated with a lower intensity to the desired temperature. Alternatively, for example in cases where mainline coating 22 is especially thick (for example, 100 mm thick), it may be desired to heat external zone 25 for an extended period of time (for example, 10 minutes) at a relatively low intensity, to allow the heat to permeate the mainline coating 22. In cases like this, the controller can be set to heat external zone 25 for 10 minutes, with transition zone 44 and center zone 42 activating for the last 5 minutes of such time period. In this example, transition zone 44 would be useful as an interface zone, heating only for 5 minutes, but heating at an intensity similar to external zone 25, to avoid damage at the interface between the mainline coating 22 and the pipe 20. Center zone 42 would heat at a much higher intensity, since pipe 20 can typically withstand (and may require) a higher intensity heat due to much faster heat dissipation properties as compared to mainline coating 22. Using this heating method, at the end of the 10 minutes, all heated sections of pipe 20 and mainline coating 22 are at the desired preheat temperature, suitable for film or tape wrapping, injection moulding, or application of a heat shrinkable sleeve.

Figure 13:
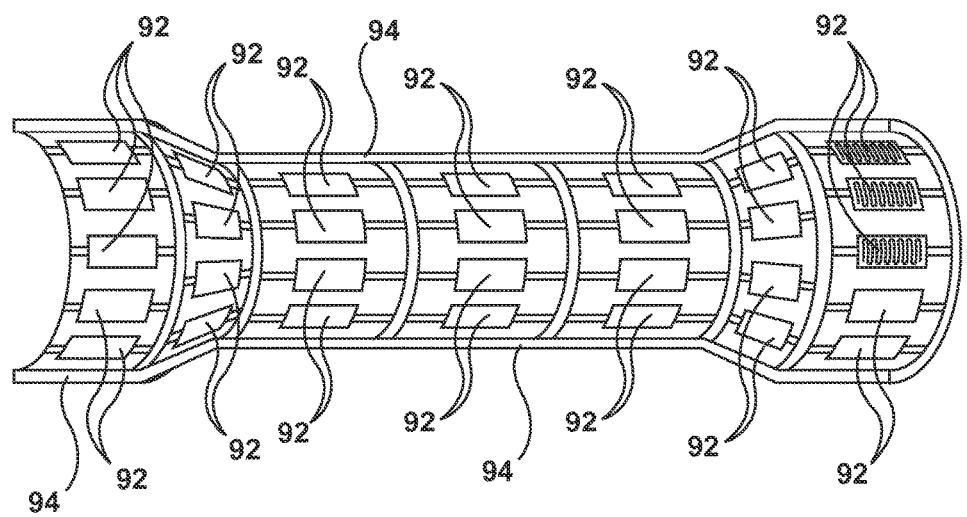
FIG. 13 shows schematically a perspective view illustrating yet a further embodiment of an apparatus in accordance with the invention, shown in an open position with heating panels exposed.

It would be understood to a person of skill in the art that the heating elements, for example flexible thin film heating elements, can be in the form of discrete panels, as shown in FIG. 13, which shows, schematically a further embodiment of one half of the clamshell design of FIG. 8. Here, the clamshell design comprises a rigid frame 94, to which is affixed a plurality of heating panels 92. Each heating panel 92 is bolted to the frame 94, and comprises both a thin film heating element an insulating/reflecting layer. As would be appreciated, each panel 92 can be connected to controller 33 individually, or, in some embodiments, to simplify operation, series of panels which require similar heating characteristics can be wired together and controlled as a group.

The panels 92 can be user-replaceable for ease of repair and maintenance, and can be a standard size (for example, 8"×20"). Briefly, panels 92 are attached to the rigid frame 94 using any means known to the art, for example, they can be bolted to the support structure.

As can be appreciated, each panel 92 can be a separate heating zone (as described above), or panels can be coupled together to form larger heating zones.

Figure 14:
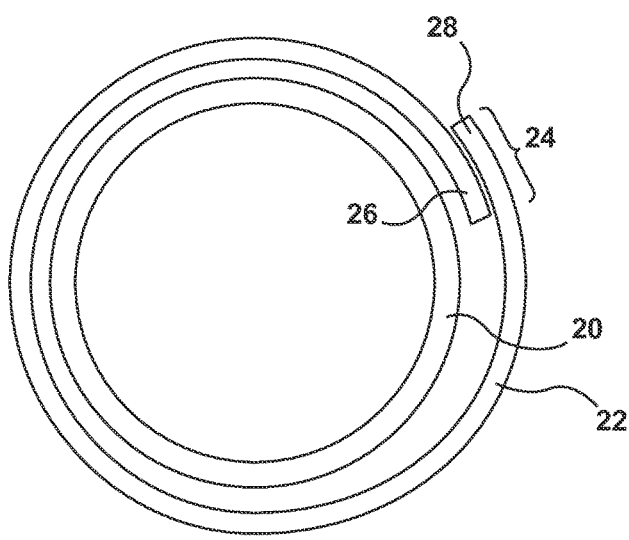
FIG. 14 shows schematically a cross-section view of a pipe joint, showing, in exaggerated form, the overlap that occurs when a wrap sleeve is used.
Figure 15:
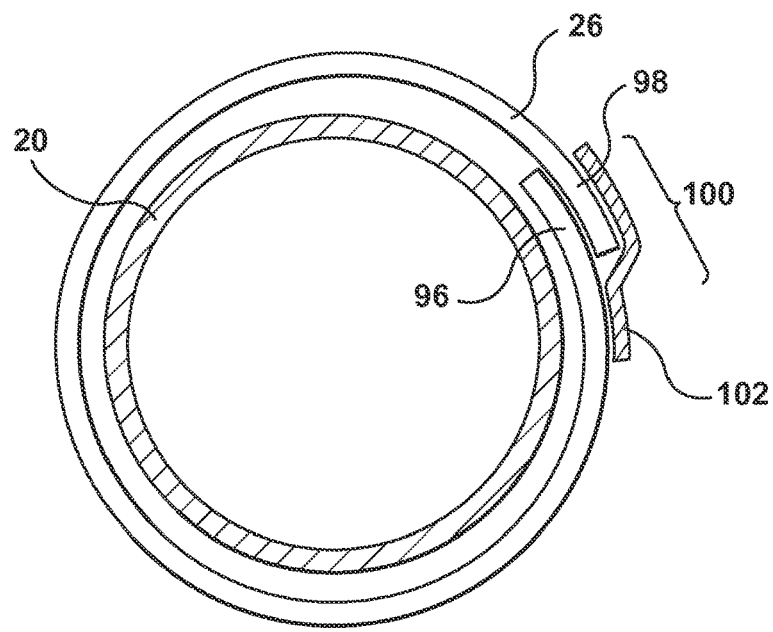
FIG. 15 shows the cross section view of the pipe joint of FIG. 14, with a closure patch applied.

In certain embodiments, a wraparound shrink wrap sleeve is used. A typical shrink wrap sleeve, applied to a pipe, is shown, as a cross-section of pipe, in FIG. 14. Shown is pipe 20 enveloped by shrink wrap sleeve 26. As would be understood by a person of skill in the art, the figure is in an exaggerated, schematic form, for illustrative purposes, since the pipe is typically much thicker than the shrink wrap sleeve. When shrink wrap sleeve 26 is applied to pipe 20, it is designed to be applied with an overlap area 100 comprising first end 96 and second end 98, which, in certain embodiments, are affixed together with adhesive. In certain other embodiments, and as shown in FIG. 15, the shrink wrap sleeve 26 applied to the pipe 20 has the same overlap area 100 comprising first end 96 and second end 98, but also comprises a closure patch 102, applied at the overlap area 100 and used to seal the two ends 96, 98. It was found that the optimal heating conditions for the overlap area 100 was different than for the area of the shrink wrap sleeve 26 not in the overlap area 100, since the double, or triple thickness of the overlap area 100 required additional time or heat for optimal heat penetration. Typically, and as shown, the overlap area 100 is typically positioned at about the 2 o'clock position on the pipe 20, and is usually 2" to 8" in width, with width typically dependent on the diameter of the pipe.

The present inventors have found that it is desirable to provide different heating parameters at the overlap area 100 of the sleeve when a wraparound sleeve was used. For example, the optimum heating parameters at overlap area 100 may be lower heat, for a longer duration, to allow better heat absorption through several layers of material, as compared to the heating parameters utilized elsewhere on the pipe. Thus, it is desirable to have different heating zones not just longitudinally, but also radially around the apparatus. For ease of reference, such radial heating zones will be referred to as heating sectors. Such radially differentiable heating sectors can also be used to address the problem described above where the lower portion of the pipe (for example, between 5 and 7 o'clock) requires more heat than the upper portion of the pipe (for example, between 11 and 1 o'clock).

Figure 16:
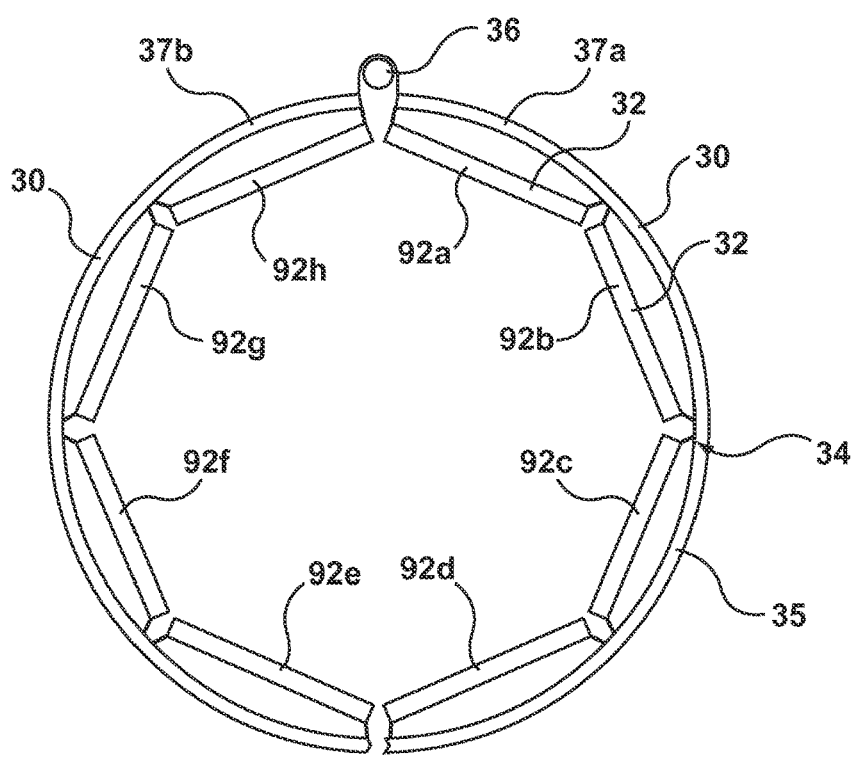
FIG. 16 shows schematically a cross section view of an apparatus of yet another embodiment of the present invention, with heating panels installed.

These radially differentiable heating sectors are illustrated in schematic form in FIG. 16, which shows a cross section of an apparatus of a clam shell, interchangeable panel, design, in a closed position. Halves 37a and 37b abut or oppose adjacent one another at edges opposite hinge 36, along a line of contact or opposition 38. The halves 37a and 37b can be pivoted from the closed position (as shown) to an open position (not shown) wherein the edges of halves 37a and 37b are spaced apart sufficiently to allow the open clam shell to be placed over the assembly of the sleeve and pipe joint (not shown). The apparatus comprises rigid frame 94 and a plurality of heating panels 92 a-h. The apparatus can be configured such that controller (not shown) can operate the heating panels 92 a-h (and/or, it would be appreciated, their longitudinal counterparts, since the apparatus is shown in cross-section) independently. Thus, when the pipe of FIG. 15 is enveloped with the apparatus of FIG. 16, the apparatus can be configured, through controller (not shown), to apply optimum, and different, heating parameters at panel 92b, and thus to overlap area 100, as compared to the rest of the sleeve 26. The apparatus can also be configured to provide higher heat at panels 92d and 92e, as compared to panels 92f-h and 92a and c, in order to overcome the problem described above, where the bottom of the pipe requires more heat than the top of the pipe. Thus, there may be three heating sectors—one for panel 92b, requiring higher or longer duration of heat in order to properly heat overlap area 100, a second for panels 92d and 92e, for heating the bottom of the pipe slightly more than the top of the pipe, and a third sector for the remaining panels. It would be appreciated that there may also be several longitudinal heating zones as hereinbefore described. Alternatively, each panel 92a-h can be individually controlled. Thus, in an apparatus with 8 sectors and 5 zones, there can be as many as 40 individual heater sections that can be controlled. However, in order to keep fabrication simple, zones and sectors that require the same heating parameters can be wired together, as exemplified with three sectors (panel 92b; panel 92d and e; and panels a, c, f, g, and h).

In one embodiment, for example, and as shown in FIG. 16, on a 24" pipe diameter, 8 panels 92a-h, each 11" wide (in circumference direction) are mounted around the diameter of the frame 94 so that there is an effective inside diameter of the device of 30". As can be appreciated, each panel as illustrated in FIG. 15 is actually a series of longitudinal panels, which can be divided in zones as described above. For example, for a sleeve width of 20", the heater panel width can be approximately 23", with a center zone of 5", with transition zones of 5", and external zones of 4". The individual zones can be wired in series with adjacent panels, so that center zones are all heated and controlled together all around the circumference, as described above, do allow shrinking of the sleeve in the center first and progressing outwards to eliminate air entrapment. In addition, panels f sectors 92d and e can be given extra heat intensity relative to the rest of the panels in order to compensate for the cooler area a the bottom of the pipe. Heater panel 92b would be positioned over the overlap area 100, and can be given extra heat to penetrate through the extra thick overlap.

FIGS. 17-19 show a further embodiment of the apparatus of the present invention. This embodiment differs from the embodiment shown in FIGS. 10-12 in that (a) the heating element layer only comprises two heat zones; and (b) the support structure 35 and, as a result, the heating element layer 32 are not three-dimensionally profiled in that the radius of the support structure 35 and the heating element layer 32 is essentially uniform through the longitude of the apparatus. Heating element layer 32 is divided into different zones, comprising center zone 42, surrounded by external zones 46. The apparatus thus has two separate heating zones, which can be independently set for different heat intensities and temperatures, or different times of heating. For example, when clamped around pipe joint 25, a heating sequence can be selected such that zone 42 heats first, thus heating the heat shrinkable sleeve 26 surrounding the exposed pipe 20. Second in the sequence, external zone 46 is activated. Thus, heat is applied starting in the middle of the heat shrink sleeve 26, then radiating outwards, which minimizes bubble formation and/or air pocket 28. Third in the sequence, zone 42 is deactivated; finally, zone 46 is deactivated. Steps 1-3 of the sequence are shown in schematic form in FIGS. 17-19, respectively. In operation, as shown in FIG. 17, Controller 33 is first actuated to operate solely the center zone 42 at a desired heat output and for a period sufficient to cause a middle portion 50 of sleeve 26 to shrink onto the weld 24 and bare pipe ends 20, (as seen, after heating, in FIG. 11). In FIG. 10, the center zone 42 is illustrated in black, denoting activation. In the second step of the sequence, depicted in FIG. 11, the controller 33 is then actuated to operate external zone 46 at a desired heat output and for a period sufficient to cause the outer portion 54 of sleeve 26 to shrink onto the mainline coating 22. During this period of heating, heating zone 42 is also active. Activated heating zones are depicted in black. The third step of the sequence is shown in FIG. 12; controller 33 is actuated to deactivate the center zone 42 so that only the external zones 46 are activated (depicted in black in FIG. 17). The external zone 46 is heated at a desired heat output and for a period sufficient to cause the outer portion 54 of sleeve 26 to shrink onto the mainline coating 22. Finally (not shown), the controller 33 deactivates all heating zones so that the apparatus 34 can be safely removed from the pipe sections 20 by an operator. The clam shell device is pivoted to the open position to facilitate moving the apparatus relative to the pipe, to align it with a further pipe joint, and the above described cycle of operation is repeated.

Figure 20:
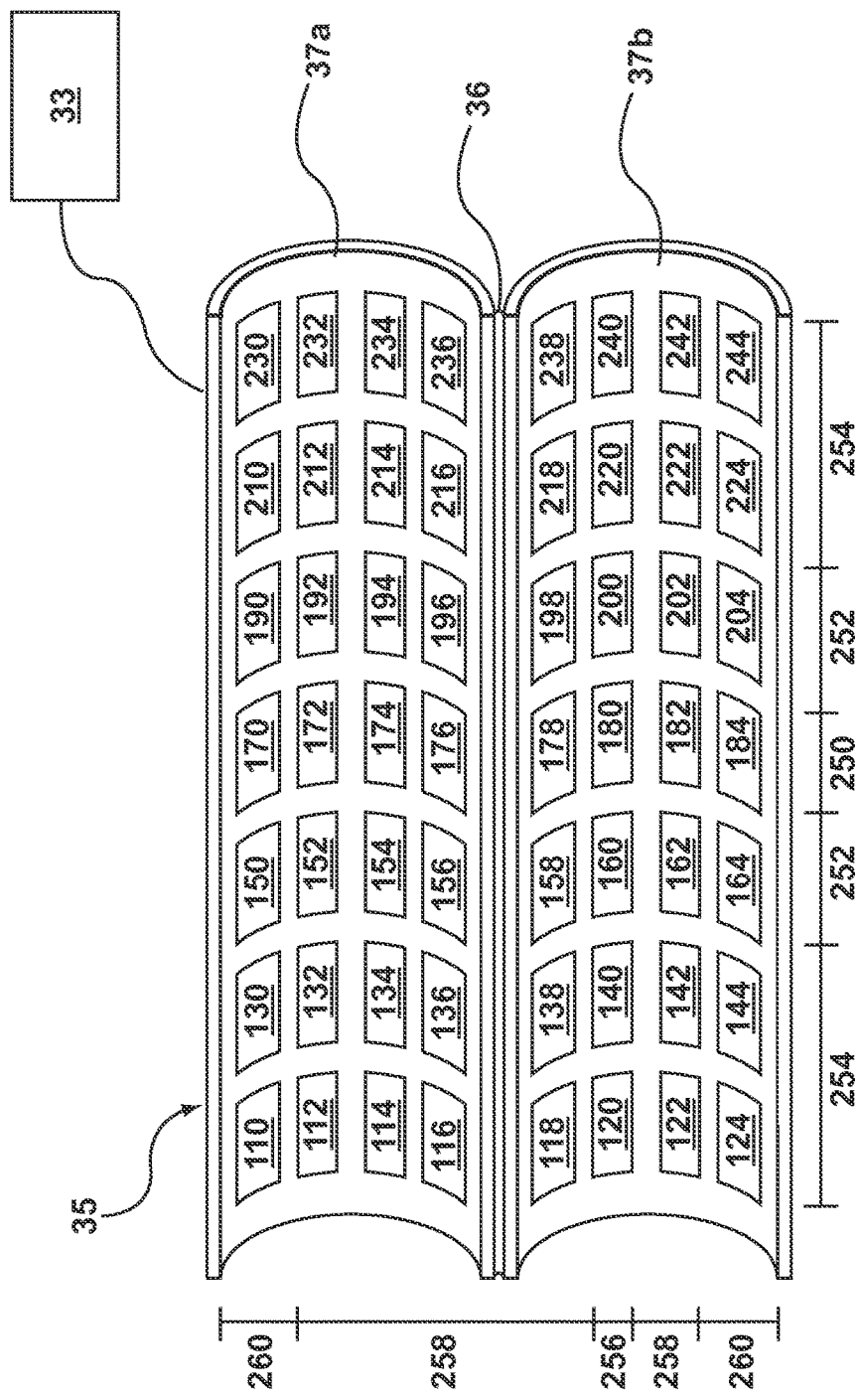
FIG. 20 shows, schematically, a perspective view illustrating yet a further embodiment of an apparatus in accordance with the invention, shown in an open position with heating panels exposed.

Of course, the apparatus as illustrated in FIGS. 17-19 can have different heating sectors, as described above. FIG. 20, for example, shows, in schematic form, one embodiment of the invention—a clam shell apparatus having 40 heating panels 110-244. The apparatus has 3 zones, and 3 sectors, for a total of 9 independent heating parameters. Thus, panels 170, 172, 174, 176, 178, 180, 182 and 184 comprise a central zone 250; panels 150, 152, 154, 156, 158, 160, 162, 164, 190, 192, 194, 196, 198, 200, 202 and 204 comprise an intermediate zone 252, and panels 110, 112, 114, 116, 118, 120, 122, 124, 130, 132, 134, 136, 138, 140, 142, 144, 210, 212, 214, 216, 218, 220, 222, 224, 230, 232, 234, 236, 238, 240, 242 and 244 comprise an external zone 254. In addition, panels 120, 140, 160, 180, 200, 220 and 240 form a first sector 256, panels 112, 132, 152, 172, 192, 212, 232, 114, 134, 154, 174, 194, 214, 234, 116, 136, 156, 176, 196, 216, 236, 118, 138, 158, 178, 198, 218, 238, 122, 142, 162, 182, 202, 222, and 242 form a second sector 258, and panels 110, 130, 150, 170, 190, 210, 230, 124, 144, 164, 184, 204, 224, 244 form a third sector 260. In use, center zone 250 heats first, with the three zones heating to different heating parameters, for example, first sector 256, which is proximal to the overlap area of the sleeve, heats to a higher temperature than third sector 260, which, when in use, heats the bottom of the pipe, which, in turn heats to a higher temperature than second sector 258, which heats the remainder of the pipe. After a predetermined amount of time, center zone 250 stops heating, and intermediate zone 252 starts heating the pipe and sleeve. Intermediate zone 252 has similar heating parameters as center zone 250 with respect to the different temperatures for the first, second and third sectors 256, 258 and 260. Once the intermediate section of the sleeve is heated to the desired level, after a predetermined amount of time, intermediate zone 252 stops heating the pipe and sleeve, and heating is initiated at external zone 254. External zone 254 is also divided into three different sectors and heating parameters, as described above for central zone 250. It is also possible to have all zones and sectors active, and/or with varying heat intensity and power, for example, by pulsating the power on and off the panels to control the heat output.

Thus, the sleeve is provided with the desired temperature and amount of heat, at three different sectors, starting with the middle of the sleeve and moving outwards, to avoid trapping air.

The operation of the various sectors and zones is operated by controller 33, which may be preprogrammed using time, power, or temperature which can be monitored with sensors.

Figure 21:
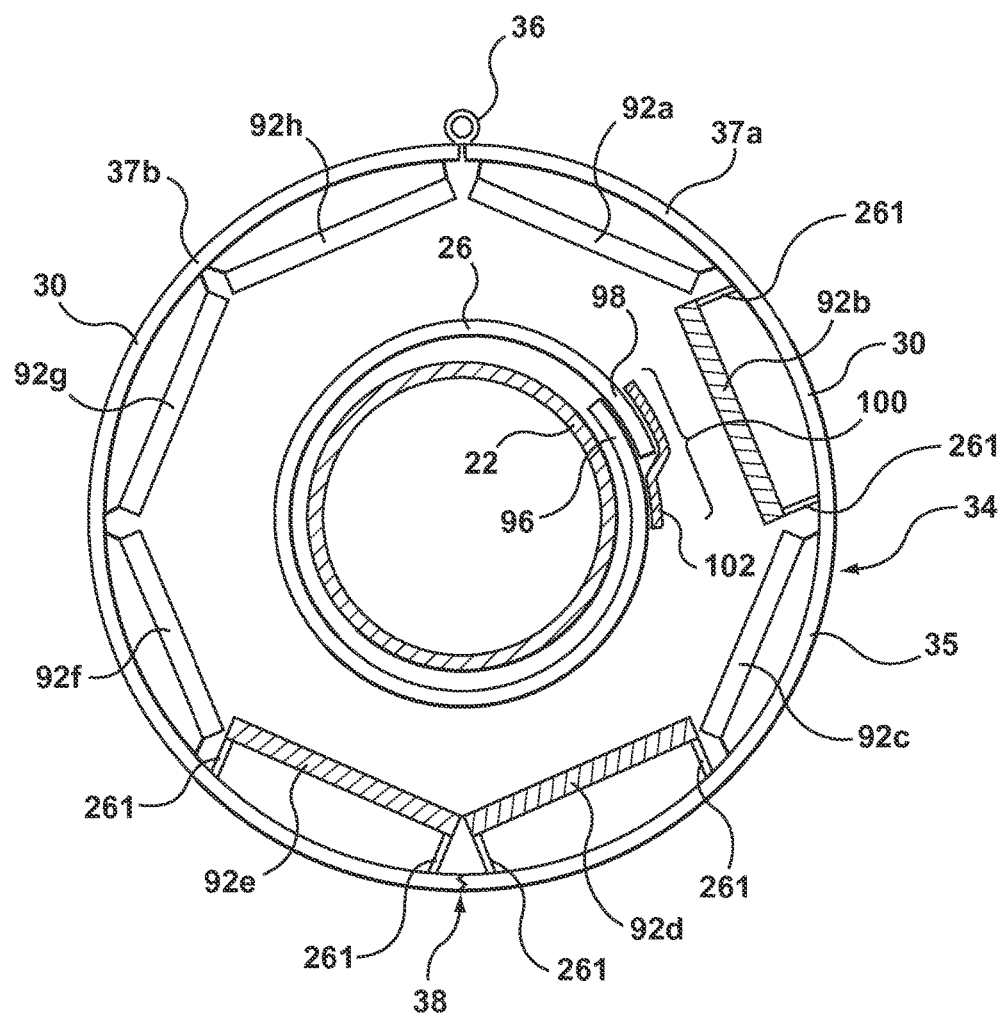
FIG. 21 shows, schematically, a cross-section view of an apparatus of yet another embodiment of the present invention, enveloping a pipe joint.
Figure 22A:
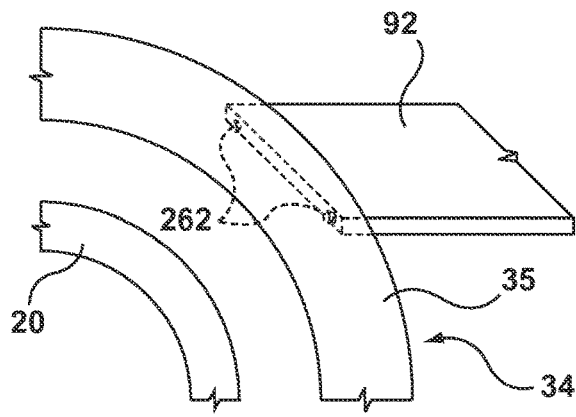
FIGS. 22a, 22b and 23 show, schematically, a perspective view showing a portion of an apparatus of yet another embodiment of the present invention.
Figure 22B:
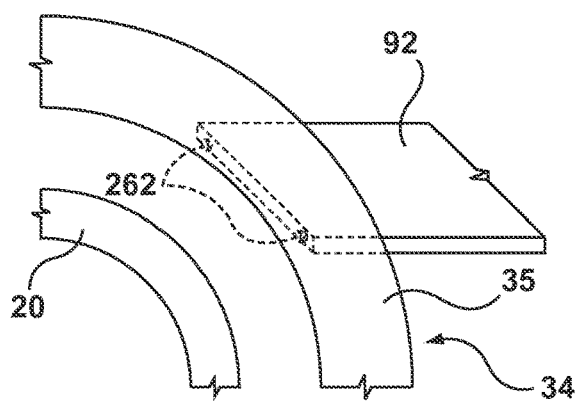
Figure 23:
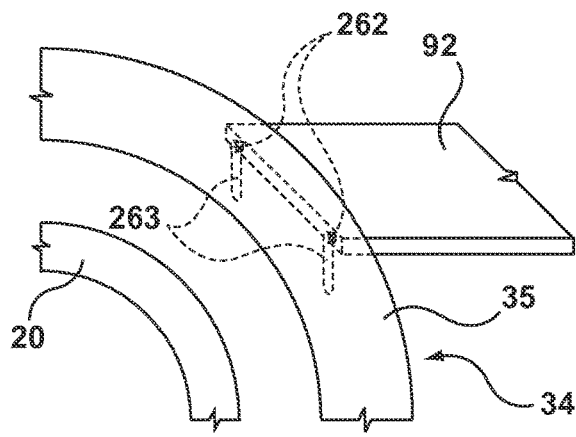

A further embodiment of the present invention is illustrated in FIG. 21. It was discovered that small changes in the proximity of the heating panels to the sleeve or pipe has significant effect on the amount of heat transferred. Thus, instead of, or in addition to, having different sectors around the circumference of the pipe, with different heating parameters, it was possible to fine tune the application of heat by adjusting the distance between the panel and the pipe and/or sleeve. For example, and as shown in FIG. 21, an apparatus 34 with a support structure 35 with an internal diameter of 30", placed on a 24" pipe 20, would have, with equidistant placement, an even gap of 3" between the support structure 35 and the pipe 20. If, as discussed above, it was desired to have higher heat at the bottom of the pipe, and at the overlap area 100, then, instead of, or in addition to having different heating parameters at panels 92b and/or 92e/d as compared to the other panels 92a/c/f/g/h, the proximity of the panels can be modified. As shown, extensors 261 are utilized to configure the apparatus so that panels 92b, 92e and 92f are mounted closer to the pipe, for example, with a 2" gap. As would be understood to a person of skill in the art, the gap could be varied and optimized for a given sleeve application. In one variation, shown in FIG. 22a and b, the panel 92 is bolted on to the support structure 35, using bolts 262, and can be re-bolted into a new position as required. FIG. 22b shows the panel 92 in a configuration where the panel 92 is bolted in a configuration closer to pipe 20 than in FIG. 22a. Alternatively, as shown in FIG. 23, a pair of slots 263 in the support structure 35 allow for easy shifting of the panel 92 radially anywhere along the slot 263 length, by loosening bolt 262 and re-tightening in the desired position. As shown in FIG. 21, extensors 261 are used between the support structure 35 and the panel 92b. Not shown, though contemplated, movement of the panels 92a-h radially, relative to the support structure 35, could utilize automation, for example, a small pneumatic cylinder or a small electric motor operated by controller 33. The positioning of the panel could be static, so that it is fixed for a given sleeve application cycle, or it could be dynamic and linked to controller 33 which would adjust the position up and down, utilizing the automation, during the heating cycle.

The ability to shift the panels radially provides another significant benefit, in that the moving of panels can also be used to optimize the apparatus for different pipes diameters. Without shifting panels, for example, an apparatus with an internal diameter of 30" can typically only be used for 24" or 26" pipe; with the ability of radially shifting the panels, the apparatus may also be used for 28" or 22" pipes. Since the apparatus is a significant expense, this flexibility is highly desirable. For small differences in pipe diameter, the same panels could be utilized. For large differences in pipe diameter, an extra panel may be used to cover the new, bigger circumference, or a panel could be removed to cover the smaller circumference. Thus, the same support structure and controller could be used, saving significant expense.

A further improvement to the apparatus is shown in FIG. 24. It was found that heating differentials caused by gaps between panels, and the heating differential between the top and the bottom of the apparatus (described above), could be addressed utilizing an air circulation system. Shown in FIG. 24 is a partial view of certain components of a modified apparatus of FIG. 16. Shown are the top two panels 92a and 92h. As shown, an air tube 264 was mounted between panels 92h and 92a. The tube 264 has small orifices 272 at 3 and 9 o'clock positions. Air 268 is blown through the tube 264, through connecting tube 266 and controlled by the controller 33; the air is forced through orifices 272 and creates circulation and turbulence in the space between the apparatus and the sleeve (not shown). This air circulation was found to even out heat and provide more consistent heating and shrinking of the sleeve. Though shown placed between panels 92h and 92a, it would be understood to a person of skill in the art that the tubing could be placed in one or more locations with orifice size and position designed to create the desired heating effect.

It was found that when an air tube 264 was added to the apparatus, it could be used for maximising the heat input efficiency. With previous designs, the tendency was to apply maximum heat output, with high power intensity, to speed up the sleeve shrinking. However, it was found that the heat input was constrained by the heat absorption rate of the shrink sleeve material. When extra heat input was applied, the sleeve tended to degrade and char on the surface, sometimes even catching fire due to the high intensity heat build up on the surface. With an apparatus with an air tube 264 with air flow linked to controller 33, a new method of heating the sleeve was invented. Heat is applied in short bursts, with intermittent air blowing to cool the surface while the heat is being absorbed in the sleeve material. For example, high intensity heat is applied for 10 seconds, then air is applied for 5 seconds to cool the surface of the sleeve while the heat is being absorbed in the sleeve material. This is then followed by a burst of high intensity heat. This cycle is repeated until the sleeve is fully shrunk. It was found that this dynamic heating and cooling reduced the sleeve application time by as much as 25%. As importantly, sleeve degradation was positively impacted—this new method provided a shrunk sleeve fitted to a pipe that was intact and had no degradation. The difference was significant—for example, when a Canusa™ GTS-PP polypropylene sleeve was applied to a 24" pipe in a conventional manner, utilizing the apparatus with no air cooling, the application took 3 minutes 15 seconds. Utilizing the new methodology of alternating heating and air cooling of the surface, the application took only 2 minutes 26 seconds.

Figure 25A:
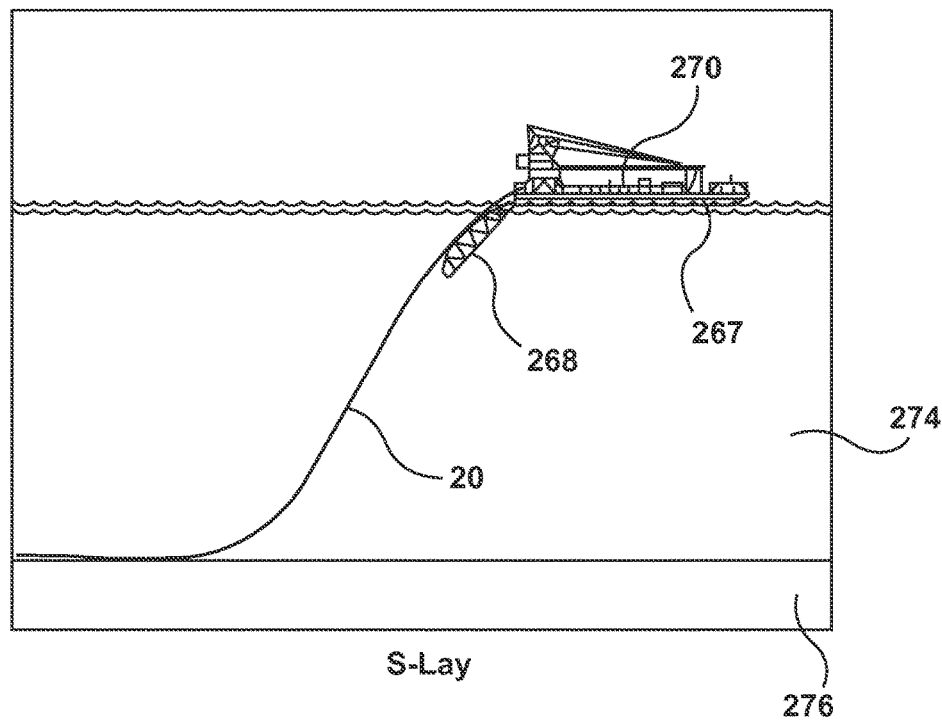
FIG. 25 a and b illustrate the different ways in which pipeline can be lain from a lay barge.
Figure 25B:
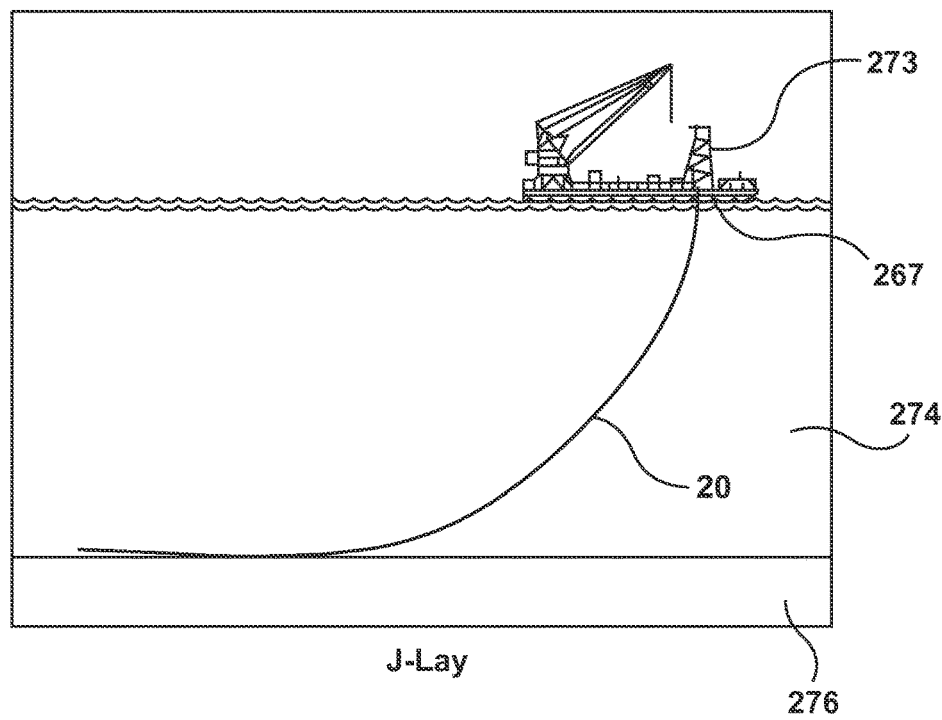

Further improvements to the apparatus have been identified for use in vertical applications. Traditional use of the apparatus is in horizontal pipe laying situations, where the pipe is substantially parallel to the ground. However, on offshore pipelines, the finished pipe is lowered into the water from a pipe laying vessel in two ways, as illustrated in FIGS. 25a and b. In an S-lay method, the pipe 20 is maintained in a horizontal position, just as in onshore construction. The pipe ends are welded and a shrink sleeve is applied to the joint. An S-lay configuration, where the pipe 20 is laid on the seabottom 276 through the water 274 by a lay barge 267 having a horizontal deck 270, is used for relatively shallow waters. However, when the water depth exceeds over 1.0 km, the pipe 20 is welded and the joint is finished in a vertical position and then laid into the water vertically, as shown in the J-lay configuration of FIG. 25b. Here, the pipe 20 is laid on the seabottom 276 through the water 274 by a lay barge 267 having a J-lay tower 273. The apparatus of the present invention was found to work very well in the application of a sleeve to a pipe in a vertical position, however, certain improvements were found to improve its use. FIG. 26 shows a frame which is used to hold the apparatus in a vertical position. The frame is typically attached to a robotic arm or a telescopic rod, or a flexing arm that can move the device at a 90 degree plane to the pipe, in order to move the apparatus from a position so that it envelops the pipe joint, to a second position where it does not. FIG. 26a-d show, in schematic representation, the frame 290 attached to the apparatus 35, enveloping a pipe 20. The apparatus 34 comprises support structure 35, and is attached to the frame 290 by mounting bracket 280, which is attached to the body 284 of the frame 290 by arms 282. The frame 290 can be attached to a robotic arm, telescopic rod, or flexing arm (not shown) through mounting bar 286.

Figure 27:
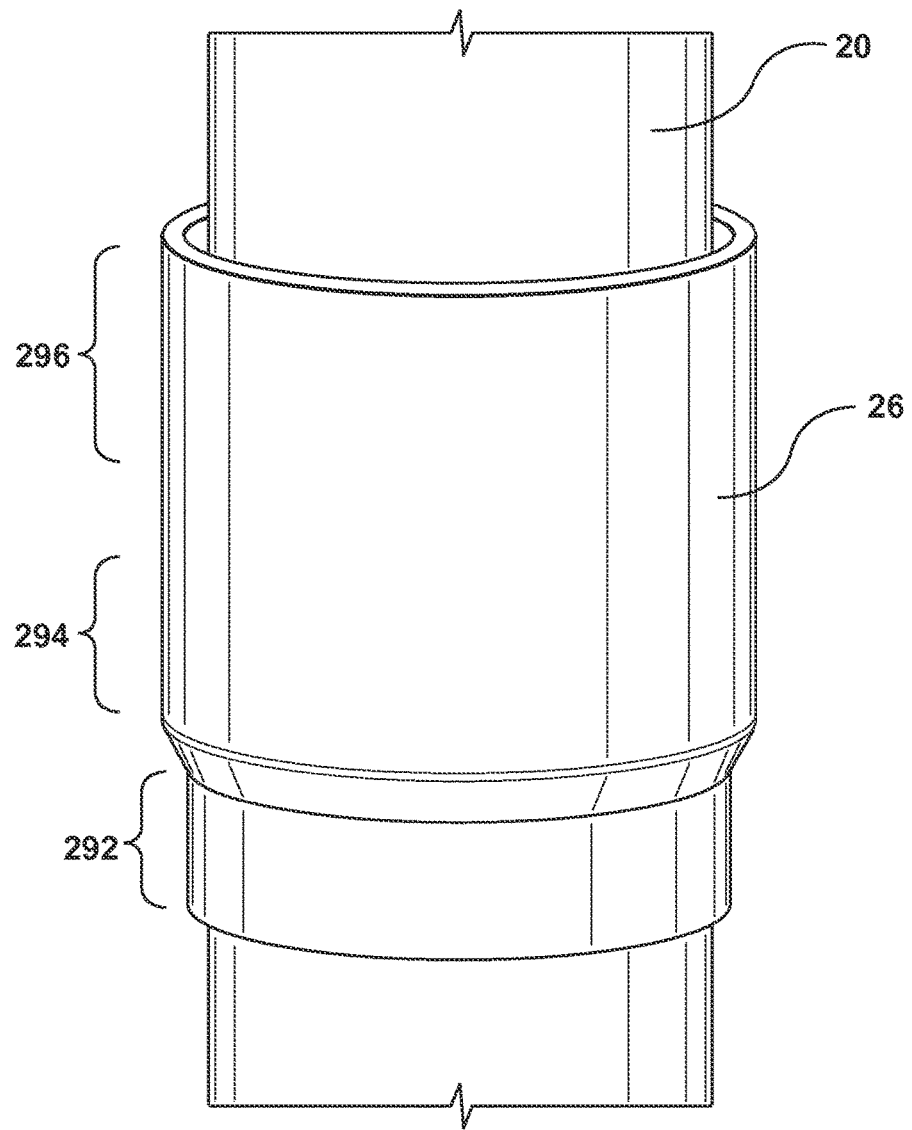
FIG. 27 shows, schematically, a vertical pipe with a partially shrunk sleeve.

An improvement to the method of shrinking the sleeve when applying the sleeve to the pipe joint was also invented. As described above, in normal horizontal applications, the sleeve should be shrunk from the middle to outwards in order to move the air out from the gap between the sleeve and the pipe joint. However, in vertical applications, it was surprisingly found that the sleeve does not make a tight contact with the pipe until fully shrunk at any given circumferential section. Therefore, and possibly due to the rising of hot air from the heated areas, it was found that the best method for elimination of the air from the gap between the sleeve and the pipe was to start heating at the bottom of the sleeve, and move upwards. Therefore, the heating method as described above was modified slightly, such that the zone at the bottom of the pipe joint (in a vertical pipe) was heated first, followed by the zone in the middle of the pipe, followed lastly by the zone at the top of the pipe. FIG. 27 illustrates a pipe 20 in a vertical orientation, as it would be seen within an apparatus utilizing the method as herein described. A sleeve 26 is applied around the pipe 20, and the bottom portion 292 of the sleeve is shrunk first, by activating the appropriate zone on the apparatus. As shown, the bottom portion 292 has been shrunk, and is in close proximity to, or bonded to, the outer surface of the pipe 20 mainline coating. Zones proximal to middle portion 294 would be activated next, with zones proximal to upper portion 296 being activated last. Optionally, for example, when using the clamp 300 described below, it is still desirable to heat the middle portion 294 first, as explained further, below.

Figure 28:
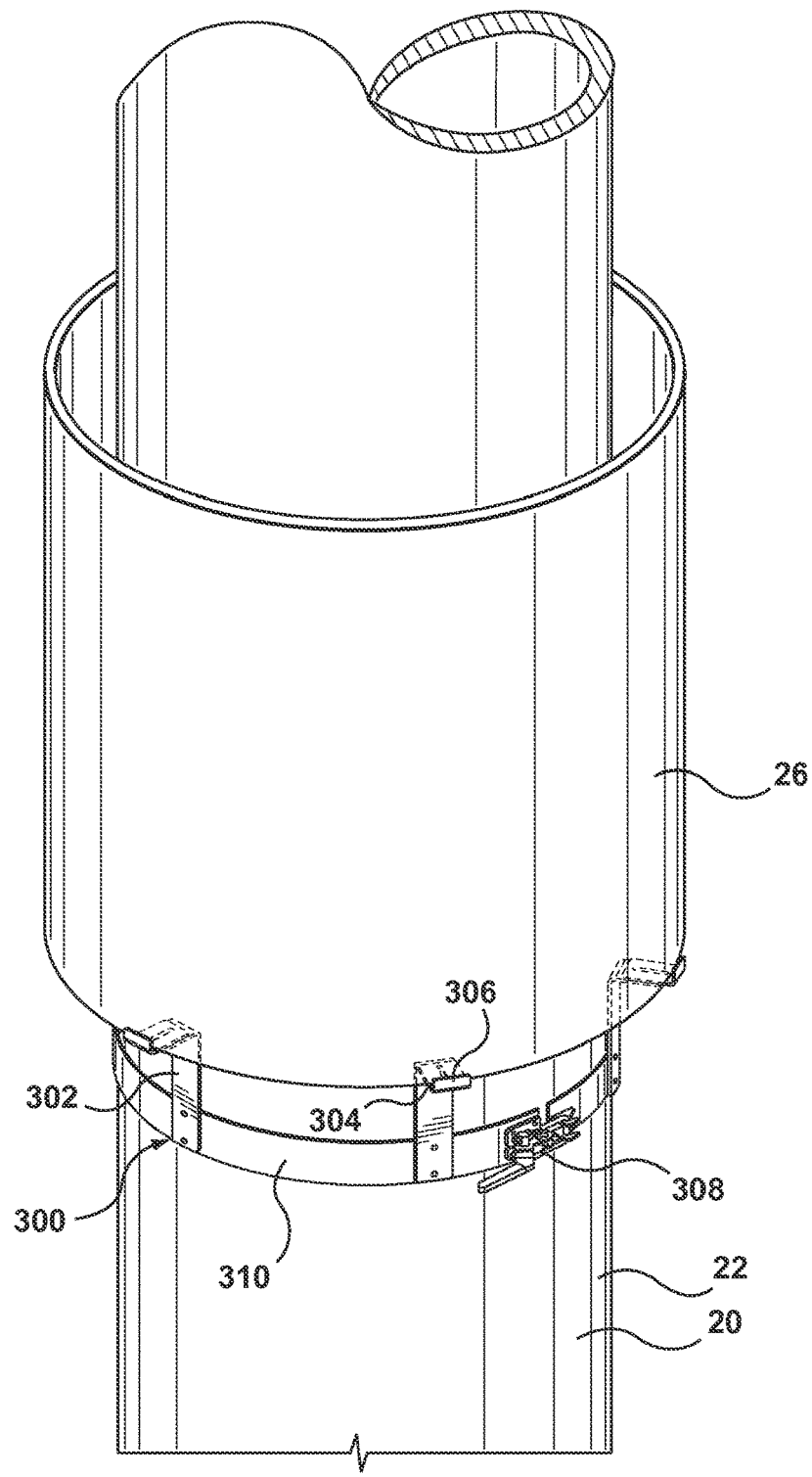
FIG. 28 shows a vertical sleeve support clamp in accordance with the present invention.
Figure 29:
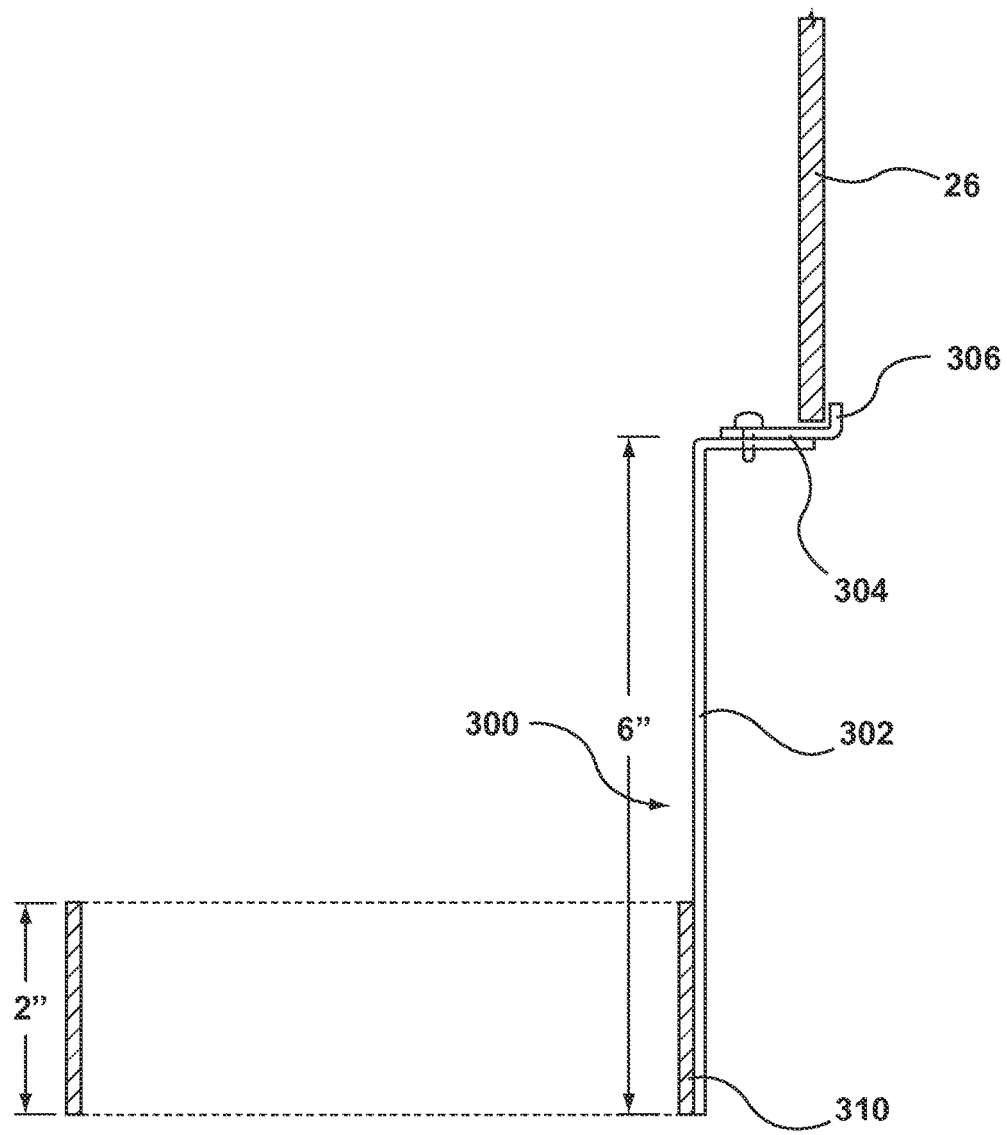
FIG. 29 shows a cutaway view of the vertical sleeve support clamp of FIG. 28.
Figure 30:
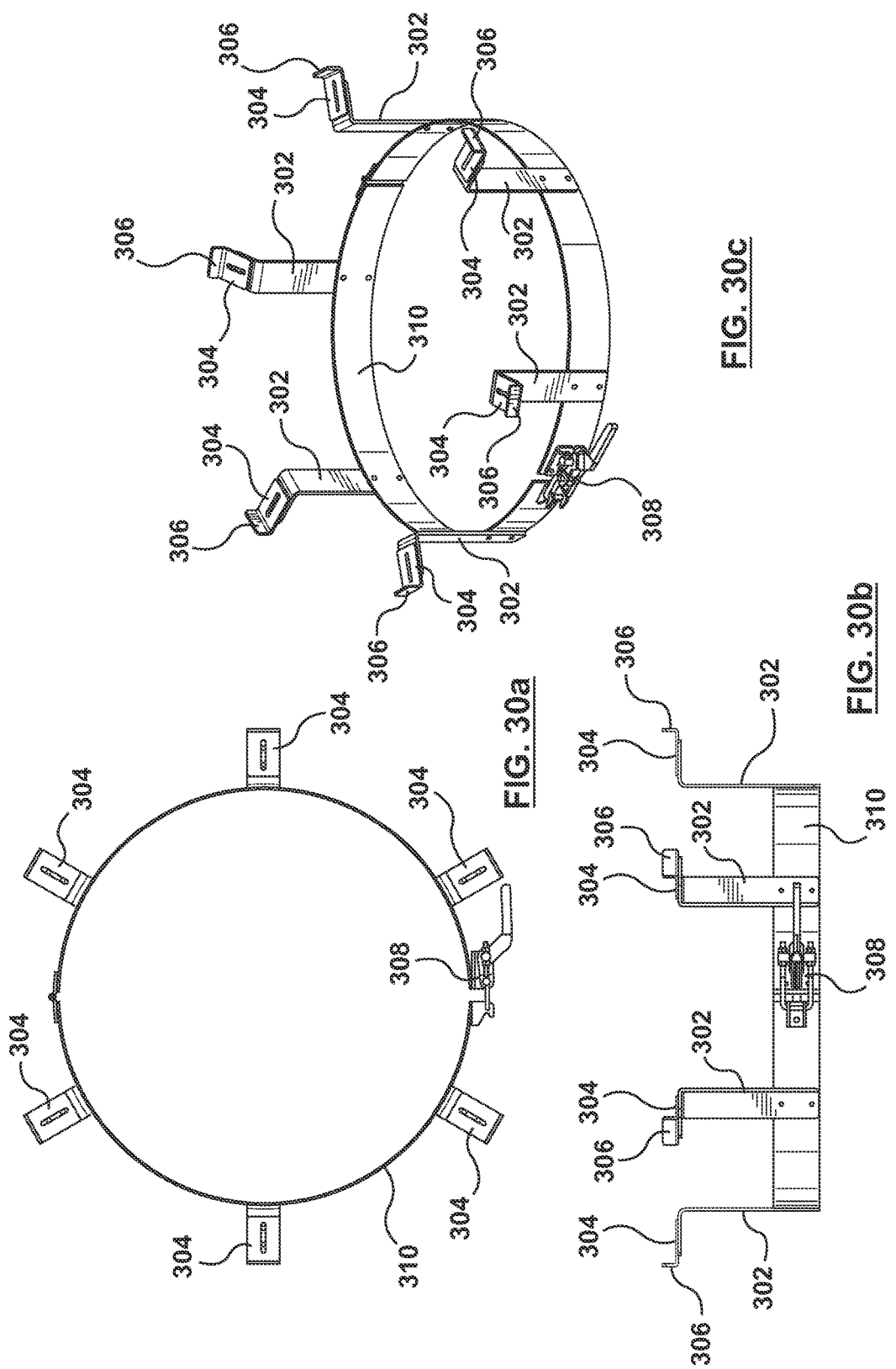
FIG. 30 a-c shows further views of the vertical sleeve support clamp in accordance with the present invention.
Figure 31:
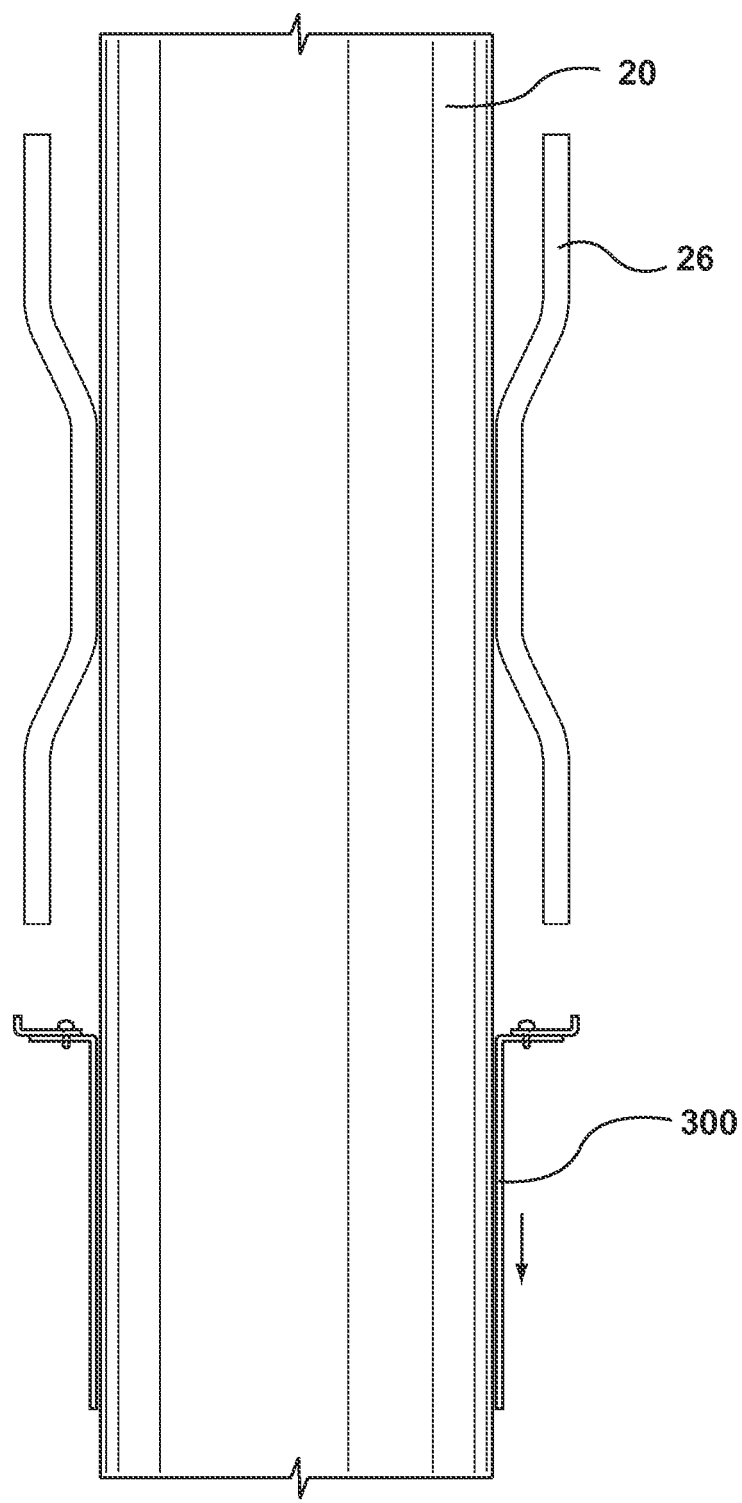
FIG. 31 shows a cutaway view of the shrink sleeve partially shrunk around a pipe in a vertical configuration.

It was found that, in vertical applications, such as on a lay barge with a J-lay configuration, there was difficulty in positioning the sleeve around the pipe in a manner that it would stay in place while shrinking the sleeve. Thus, a vertical sleeve support clamp was created, as shown in use in FIG. 28, in cross section in FIG. 29, and further in FIGS. 30 a-c. As shown, clamp 300 comprises band 310, which is clamped to the mainline coating 22 of pipe 20 utilizing closure 308. Clamp 300 has vertical legs 302 extending from the band 310 in the direction of the desired location of the sleeve 26, and tongues 304 at the ends of each of the vertical legs 302. As shown, clamp 300 also has lips 306, which are vertical portions at the opposing end of tongues 304, which prevent sleeve 26 from slipping off of tongues 304 when the sleeve 26 is resting on the tongues 304. In use, the clamp 300 is fitted to the pipe 20 such that sleeve 26 can rest on tongues 306 and be in the desired position for shrinking Once the clamp 300 and sleeve 26 are in place, an operator can position the apparatus 34 around the sleeve 26 for shrinking the sleeve in a manner as hereinbefore described. Legs 302 were found to be advantageous so that the band 310 is away from the apparatus 34 and does not interfere with its operation. In use, the clamp 300 is positioned at a set distance below the joint. The sleeve 26 is then wrapped around the pipe and made to rest on the tongues 304. Note that, when tube sleeves are used, they are inserted on the pipe before welding, and held on the clamp frame at a lower position, then brought to the application position after the welding of the pipe. The shrink device is then positioned over the sleeve and the middle of the sleeve is first shrunk, which effectively "locks" the sleeve in place due to the intimate contact and hoop stress. As shown in FIG. 31, the support clamp 300 is then dropped, and the sleeve 26 remains in place due to the hoop stress around its middle. Note that it is important that band 310 is away from the heating apparatus (not shown), so that the clamp 300 can easily be released while the apparatus is in place around the sleeve 26.

A further improvement to the apparatus comprises pre-warming the heating panels before applying the apparatus to the sleeve to be shrunk. It was found that, when the device is placed over the sleeve and switched on, there was a time delay while the heater reaches the desired heat/power level, since it is starting from a relatively cold start. Any time savings to speed up the process would be of great financial value, for example, on a pipe lay barge, where the cost of a minute of operation is in the hundreds of dollars.

Thus, a method of utilizing the device comprises, immediately prior to placing the device on the sleeve, the initiation of a "pre-warming" program. The "pre-warming" program, controlled by controller 33, is a 5-120 second time period where the panels are activated. The pre-warming time is either set as a fixed time and power, or alternatively, is thermostatically controlled, where the pre-warming occurs until the panels reach a certain temperature. In certain embodiments, an indicator on the apparatus or controller indicates that the pre-warm cycle is in operation; a second indicator may be utilized for informing an operator when the pre-warming cycle is complete.

The method of heating the sleeve or pipe could also be sped up utilizing the air tube 264 as shown in FIG. 24. Where the apparatus is configured with such an air tube 264, it was found that the heating of the sleeve could be speeded up significantly by injecting hot air inside the device. Immediately after closing apparatus 35 around the sleeve 26, hot air 268 with temperature ranging from 60° C. to 250° C. was blown through air tube 264. This was done while the heating panels 92 were warming up. Thus, the hot air was already heating the sleeve surface as the heating panels 92 were coming on line. Once the heating panels 92 came to full desired power, the hot air was switched off. It was found that, utilizing hot air "priming" in this manner, time savings of up to 13% were realized, as compared to a cold start of the heating panels. Optionally, the use of hot air could be continued through the shrink cycle (i.e. through the entire heating process), either as supplementary heat to speed up the shrinking operation, or to decrease energy requirements and/or costs, especially, for example, on a lay barge, where hot air can be routed from the engines much more economically than the operation of electrically-powered heating panels.

In addition, pre-heating the shrink sleeve itself before application to the pipe was found to significantly increase shrink sleeve response and reduce the time it took to apply a shrink sleeve around a pipe. Thus, for example, with a Canusa™ GTS-PP polypropylene sleeve applied on an 24" pipe, it was found that, without any sleeve preheating step, and the sleeve and apparatus at an ambient temperature of 23° C., shrink time was 3 minutes, 15 seconds. However, when the sleeve was kept in an oven at 65° C. for 5 minutes, then applied to the pipe, the shrink time was reduced to 2 minutes, 55 seconds. Therefore, a method of the present invention comprises: pre-heating the sleeve at about 65° C. for 5 minutes, applying the sleeve to a pipe joint, then utilizing the apparatus of the present invention to shrink the pre-heated sleeve to the joint. The heating time and temperature may be varied depending on sleeve type, and ambient conditions.

It would be understood to a person of skill in the art that further time savings would be possible by combining the pre-heating methods—for example, by pre-heating the sleeve and pre-heating the panels 92, as described above.

Figure 32:
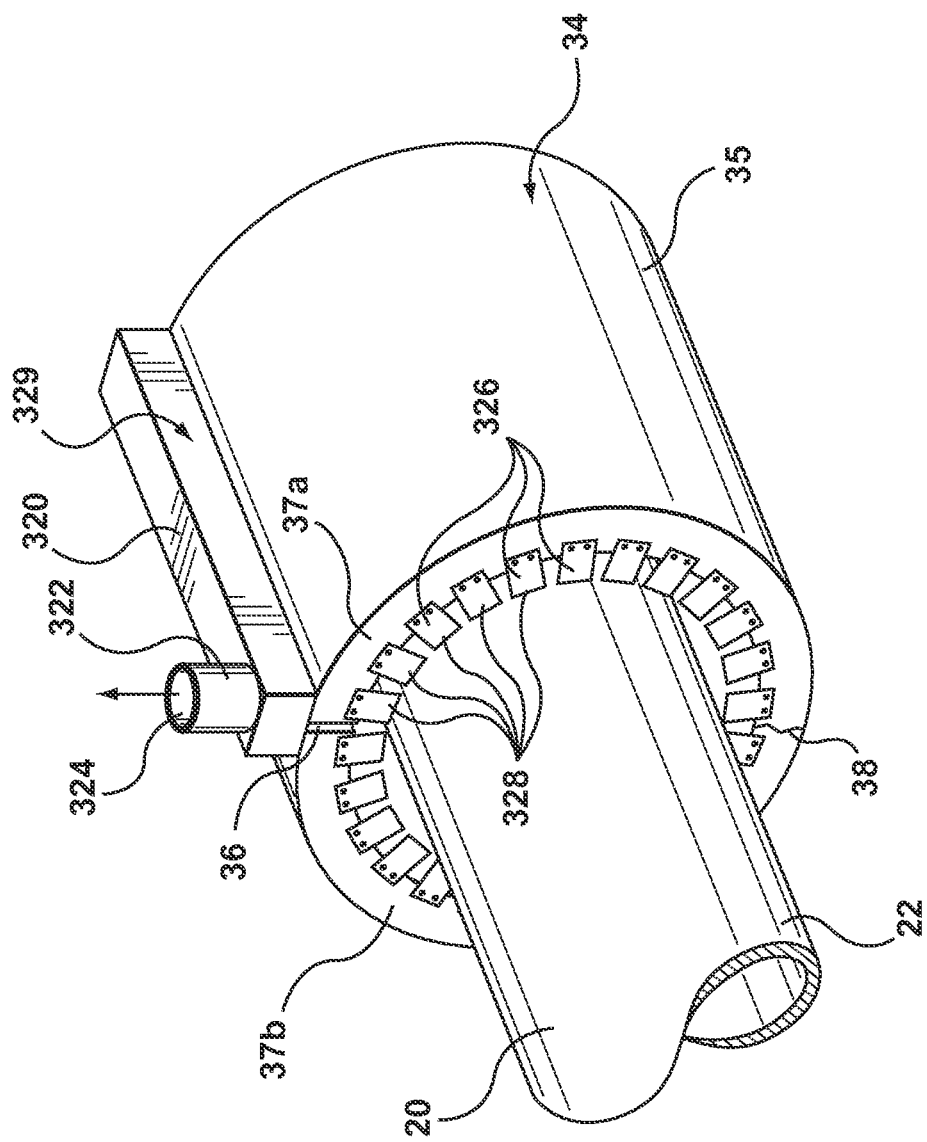
FIG. 32 shows yet a further embodiment of the present invention, in a schematically drawn, perspective form.

Two further improvements to the apparatus are illustrated in FIG. 32, which shows an apparatus similar to that of FIG. 2, in a schematically drawn, perspective form. Shown is pipe 20 having mainline coating 22, enveloped by apparatus 34 having support structure 35 and heating elements (not shown). The apparatus 34 comprises shields 328 which partially or fully close the gap between the apparatus 34 and pipe 20. The shields 328 can be present on both sides of the apparatus 34 (shown only on one side in FIG. 27, due to the perspective). Shields 328 can be of any heat resistant material, for example, glass cloth or sheet metal, and are useful to maintain the heat inside the apparatus 34 and to prevent cooling of the heating panels while in use in a windy and/or cold environment. The shields may be in the form of a continuous band or, as shown, as small flaps 326 which can be removed to control the air/fume/heat exchange between the outside and the inside of the apparatus. For example, to balance the temperature differential described above between the top of the pipe and its bottom, some flaps on the top side of the apparatus could be removed to allow heat to escape. This also facilitates venting of fumes arising from the heating of the sleeve.

Also shown in FIG. 32 is an exhaust vent 324 and exhaust vent chamber 320, which allows the venting of gas and fumes from the heat shrinking process. As shown, and in certain embodiments, the exhaust vent chamber 320 runs the length of the apparatus, collects fumes and hot air from the apparatus and exhausts it through one defined aperture, the exhaust vent 324. This allows the management of the heat and fumes, both to help optimize the shrink cycle, but also for health and safety of the user. Also shown in FIG. 32 is smoke detector sensor 329, which is connected to controller 33 and which is able to detect the level of fumes or fire and signal the controller 33 to reduce power output to the heating panels, to switch off the power to the heating panels, or to sound a warning, as desired.

Figure 33:
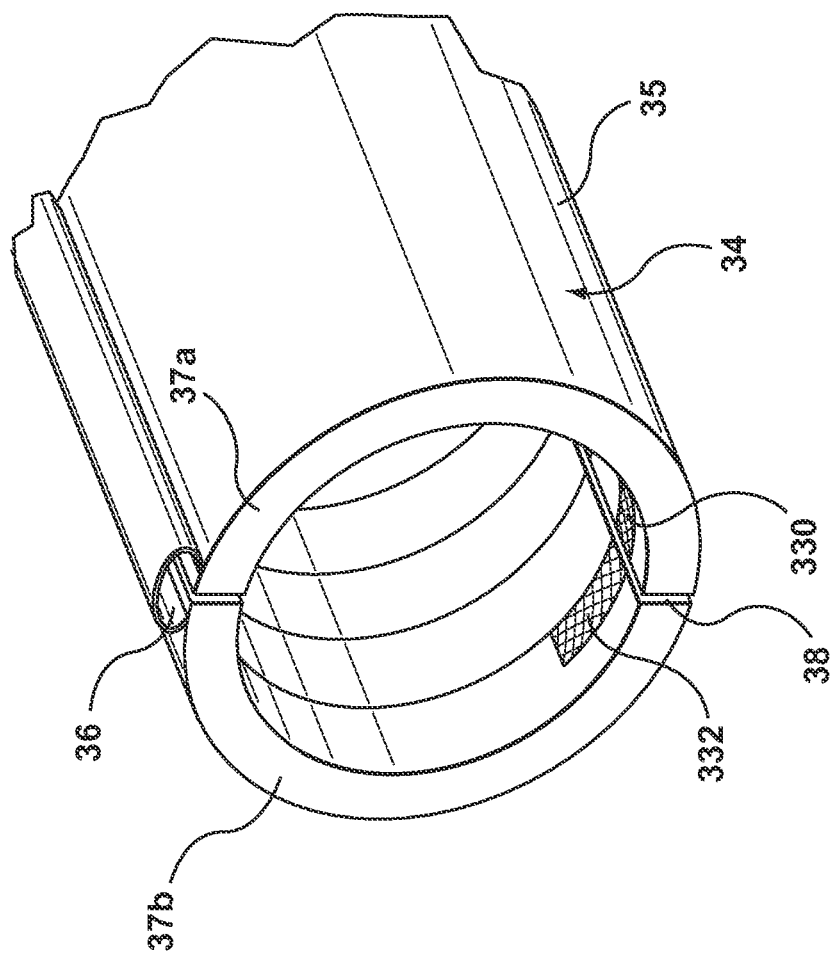
FIG. 33 shows yet a further embodiment of the present invention, in a schematically drawn, perspective form.
Figure 34:
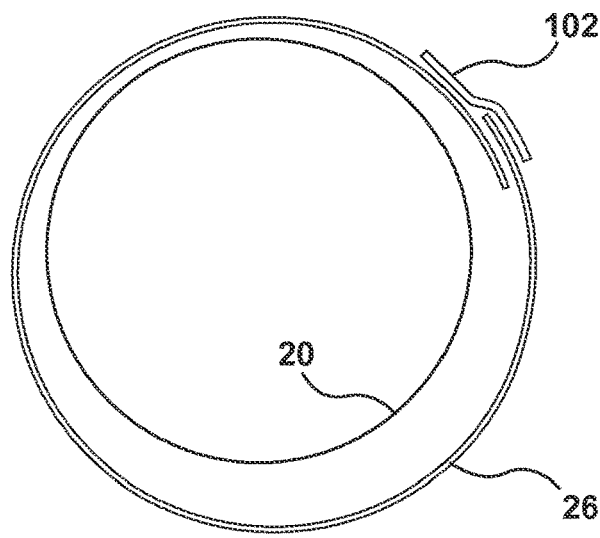
FIG. 34 shows a cross section of pipe with a non-shrunk sleeve.

A further improvement of the apparatus is illustrated, in schematic view, in FIG. 33. It was discovered that after a number of sleeves were shrunk by the apparatus, in horizontal orientation, there was sometimes the tendency for some sleeve types to drip adhesive onto the heater panels at the bottom of the device. This was disadvantageous, since accumulated adhesive material generated smoke, and sometimes ignited into a flame during the shrinking cycle, affecting the efficiency of the shrinking cycle, sometimes charring the sleeve, and creating safety issues. This dripping of adhesive typically and primarily occurred at the two ends of the sleeves, with the adhesive dripping from the edges of the sleeve. FIG. 33 shows an apparatus 34 as hereinbefore described, having support structure 35, a hinge area 36, two clamshell halves 37a, 37b, and line of contact/opposition 38. The apparatus 34 comprises four wire mesh strips (two shown as 332, 330, and two others not shown on the opposing side of the apparatus 34). The wire mesh strips 332, 330 are positioned near the bottom of the device when in use, as shown, and have a mesh orifice size of 2 mm×2 mm for example, or, for example, larger than 1 mm×1 mm. The mesh caught most of the adhesive drips and prevented them from falling onto the heating elements (not shown). Mesh size was chosen so that there was minimum interference with the heat transfer, and to the shrinking of the sleeve. Thus, the mesh strips 332, 330 caught most of the adhesive drips. Once a significant amount of adhesive drip build up was accumulated on the mesh strips 332, 330, they were cleaned or replaced. Mesh strips 332, 330 were configured to be readily replaceable with new strips. Cleaning comprises a "clean" program on the apparatus, controlled by controller 33, which applied high intensity heat in the bottom sectors and the respective side zones, to target the build up area. The adhesive build up was thus burned up and sublimated. It would be appreciated that the wire mesh strips could be substituted with perforated metal strips with appropriate sized perforations.

A further improvement to the apparatus of the present invention is illustrated in FIGS. 34-39. One problem that was faced with the apparatus and method as previously described is that, in a pipe 20 in a horizontal configuration, when the sleeve 26 is wrapped around the pipe 20, the sleeve 26 tended to rest on the pipe 20 on the top of the pipe 20, but "flop" at the bottom of the pipe, meaning there was hardly any gap between the sleeve and the pipe at the top of the pipe, and a big gap between the sleeve and the pipe at the bottom of the pipe. This resulted in uneven shrinking of the sleeve, and also resulted in a higher thickness of sleeve 26 at the bottom of the pipe, as compared to the top of the pipe. More importantly, there was higher probability of air entrapment at the top of the pipe, since the sleeve edges contacting the hot pipe would adhere to the pipe, seal the area and prevent air from escaping.

Figure 35:
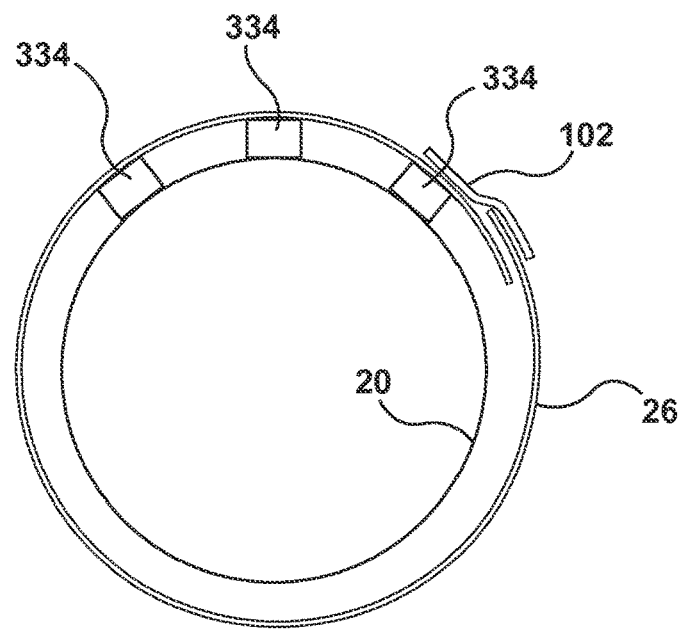
FIG. 35 shows spacer configurations on a cross section of pipe with a non-shrunk sleeve.
Figure 36:
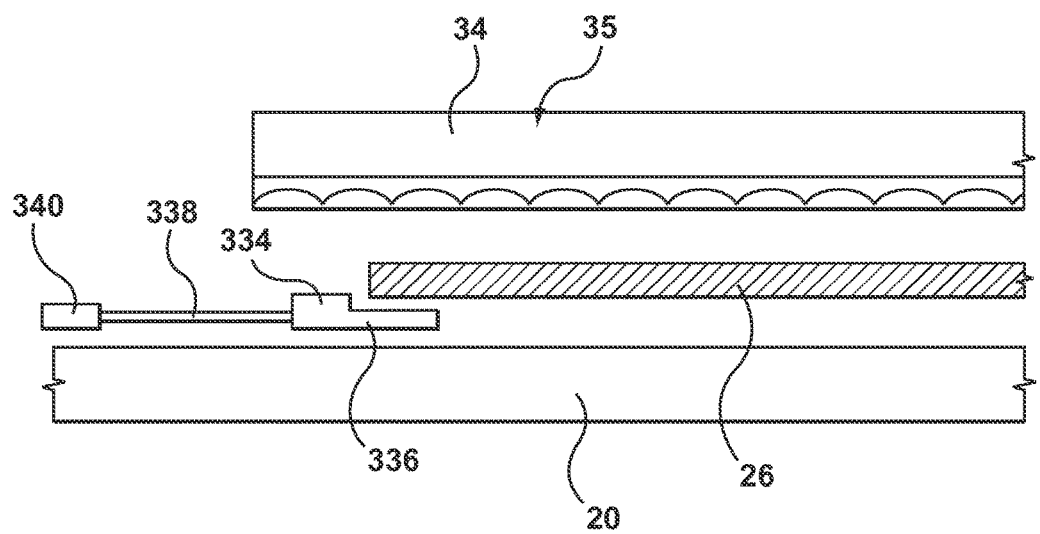
FIG. 36 shows a schematic, longitudinal cross-section of a section of pipe having a sleeve, an apparatus, and a spacer configured thereto.
Figure 37:
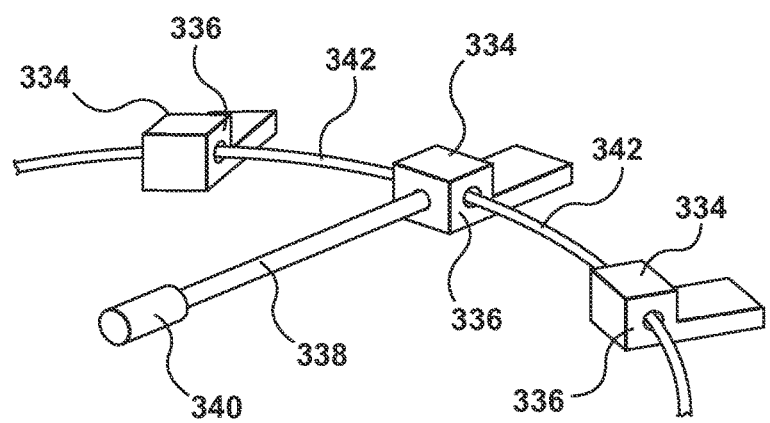
FIG. 37 shows a perspective view of a spacer apparatus of the present invention.

It was discovered that the above problem could be resolved by placing spacers 334 near the top of the pipe, for example and as shown in FIG. 35, at the 10, 12 and 2 o'clock positions. Spacer height was chosen to provide a uniform gap around the pipe. The spacers could be made from plastics, metals or wood, and shaped so that they can be reliably inserted under sleeve 26 and removed with ease. The spacers had to be designed so that they did not interfere with the placement or the operation of the device. One example of appropriate spacers of the present invention is shown in FIG. 36. As shown, spacer 334 comprises a body 336, an arm 338, connected to a handle 340. The spacer 334 can easily be placed in position, and, more importantly, removed during the shrink operation, due to the arm 338 and handle 340 configuration. In an alternative configuration, shown in FIG. 37, three or more spacers 334 each having a body 336 are connected together at an appropriate distance from one another by rod 342. In this configuration, the spacers 334 only require one arm 338 and handle 340, and can be inserted and removed much more easily and rapidly. Rod 342 matches the curvature of the pipe, so that the assembly can easily rest on top of the pipe.

Figure 38:
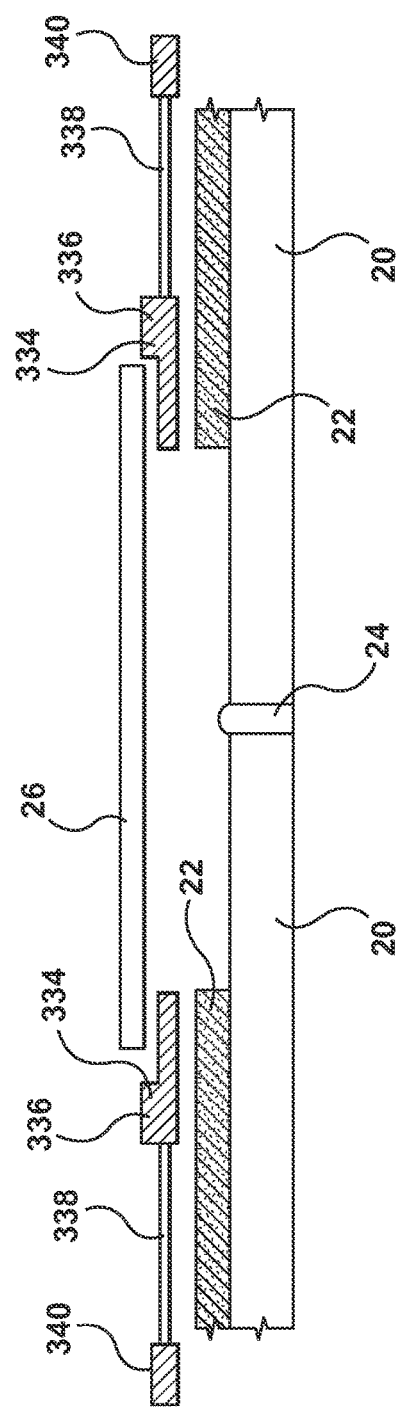
FIG. 38 shows a schematic, longitudinal cross-section of a section of pipe having a sleeve, an apparatus, and a spacer configured thereto.
Figure 39:
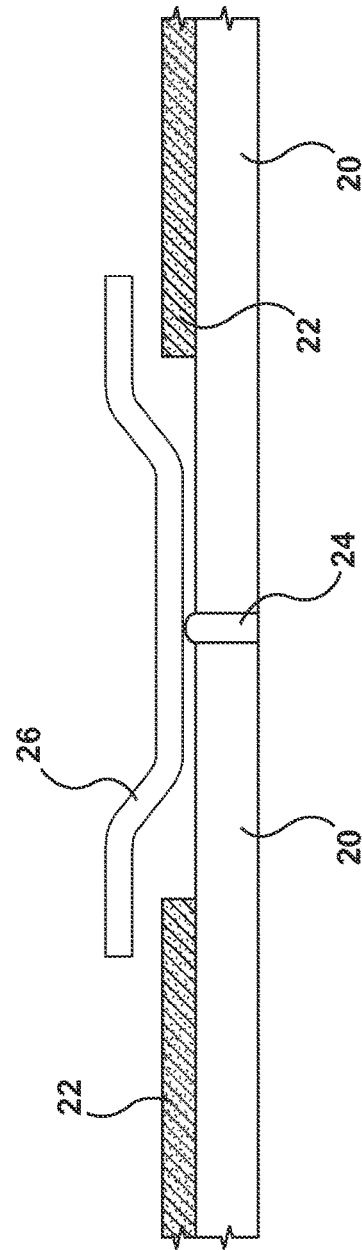
FIG. 39 shows a sleeve partially shrunk to a pipe joint.
Figure 40C:
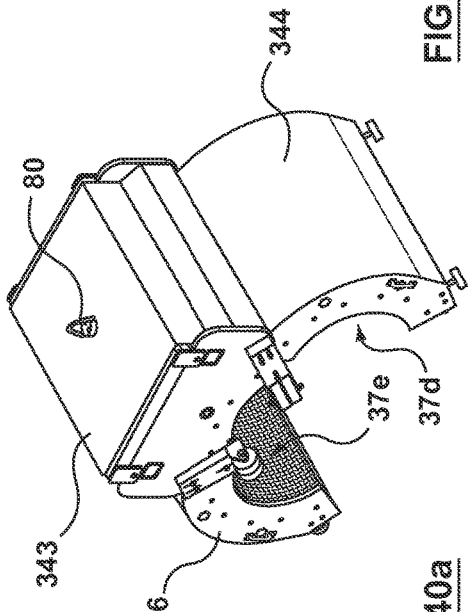
FIGS. 40a-d show yet a further embodiment of the apparatus of the present invention.
Figure 40D:
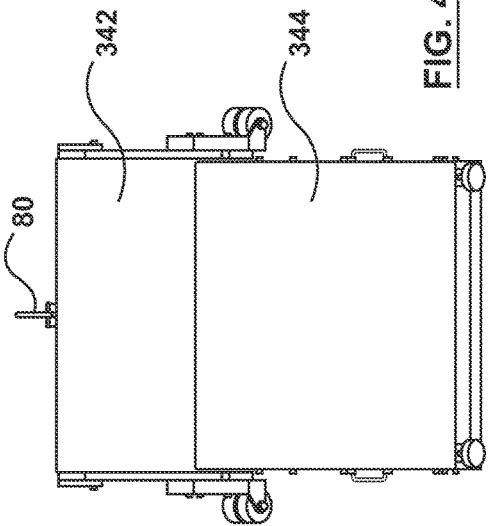
Figure 40A:
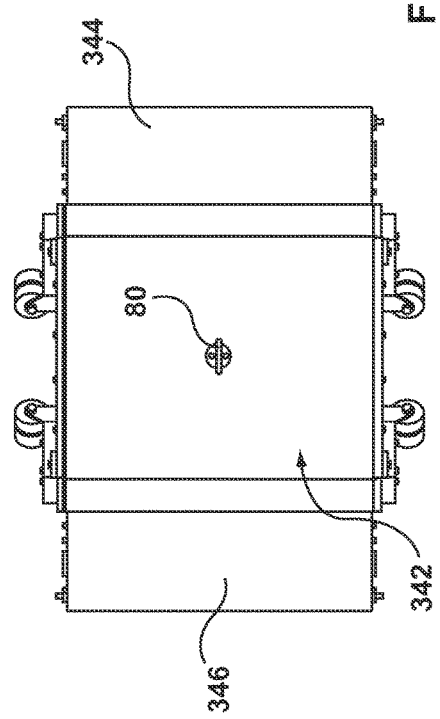
Figure 40B:
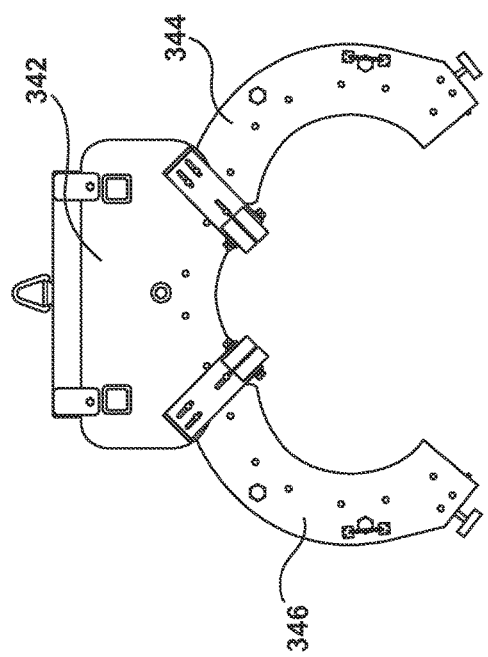

A method of utilizing the spacers 334 is as follows. After the pipe joint is prepared, and is ready for sleeve application, the spacers 334 are positioned on the mainline coating 26 on either sides of the joint, as shown in FIG. 38. The sleeve 26 is then wrapped around the joint with the edges resting on the spacers 334. The apparatus is then placed over the joint as shown in FIG. 36, and is switched on utilizing the controller (not shown). The controller activates the heating areas of the apparatus, which shrinks the sleeve 26, starting in the middle section of the sleeve. This "locks" the sleeve in place in a centered position, as shown in FIG. 39. At this point in the process, the spacer 334 is removed, pulled out by handle 340 and the rest of the heating cycle, as described previously, continues.

Though, as shown, the spacer 334 is removed manually, it would be understood to a person of skill in the art that this step could be automated, linked to the controller, so that after a given time lapse, or at a specific heat intensity of the center zone, the spacer is automatically removed with a pneumatic piston or a driven motor. The spacer 334 could be a separate apparatus, or could be incorporated within the apparatus of the present invention.

A further improvement for the present invention is a water and dust tight configuration. Since the apparatus is used in remote locations with all kinds of inclement weather conditions, such as rain, snow storms, desert sand, and waves in the middle of the ocean, it was desirable to make the apparatus water and dust tight. FIG. 40a-d shows a further embodiment of the present apparatus, most similar to the apparatus described in FIG. 6, but comprising a water and dust resistant outer casing. The apparatus comprises covered box 343 which is mounted on the support frame 86. The box 343 houses the majority of the device electrical components (not shown), and the motion cylinder or jacks (not shown) that control wings 37d, 37e. The covers 344, 346 for wings 37d, 37e, respectively, are also made water tight by using appropriate sealing material such as silicone or other rubber gaskets.

Figure 41A:
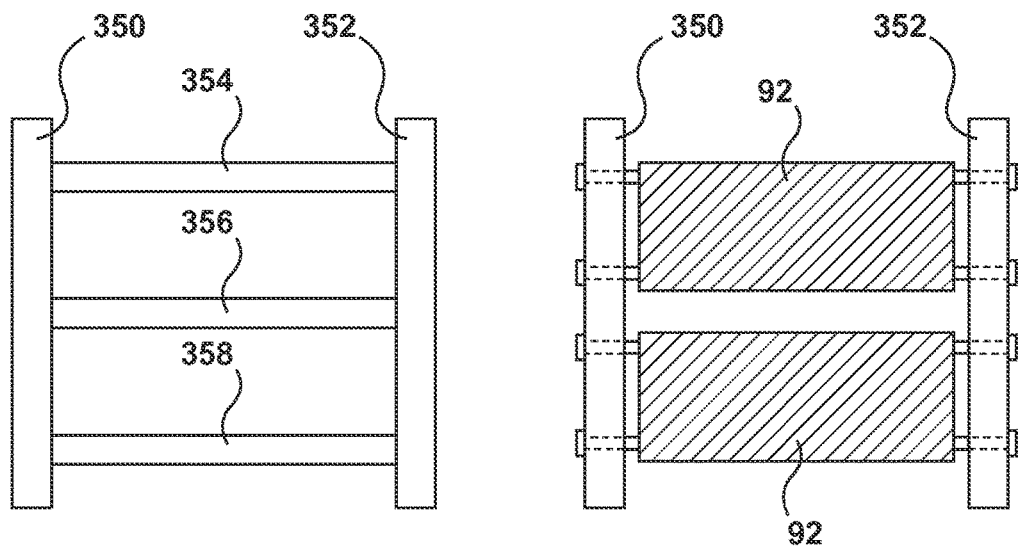
FIGS. 41a-b show a portion of the apparatus of the present invention, in yet a further embodiment.
Figure 41B:
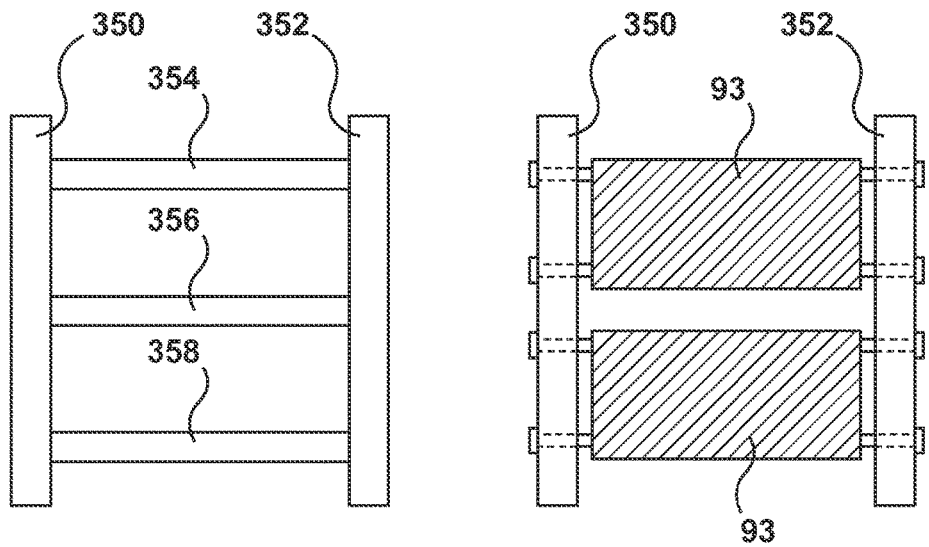

A further improvement to the apparatus comprises an adjustable width coil frame support structure, which provides flexibility for the width of the joint (and sleeve). In the pipeline industry, the exposed steel joint width after welding, known as the "cutback", varies from project to project. These cutbacks can be from 6" to 20" in width, and sometimes even wider. An adjustable width support structure, combined with the use of heating panels of different sizes, creates an apparatus which can be used for cutbacks (and sleeves) of highly varying width. FIG. 41 illustrates a schematic view of a section of such an apparatus, showing different widths in two positions, one in FIG. 41a, the second, narrower width in FIG. 41b. The apparatus comprises two flanges 350, 352 which are connected by rods 354, 356, 358 for a given width. Only three rods 354, 356, 358 are shown for illustrative purposes, but, as would be understood by a person of skill in the art, more rods would be utilized. Heater panels 92 are mounted between flanges 350, 352, either (as shown) to the flanges 350, 352 themselves, or to the rods 354, 356, 358. Again, only 2 heater panels are shown for illustrative purposes, but, as would be understood by a person of skill in the art, more panels would be utilized. When it is desired to utilize the device on a pipe with a narrower cutback, the rods 354, 356, 358 are replaced with shorter rods 360, 362, 364, as shown in FIG. 41b. Narrower panels 93 can then be installed. It would be appreciated to a person of skill in the art that the rest of the apparatus components, electrical systems, and controller would only require minor modifications, if any.

Figure 44:
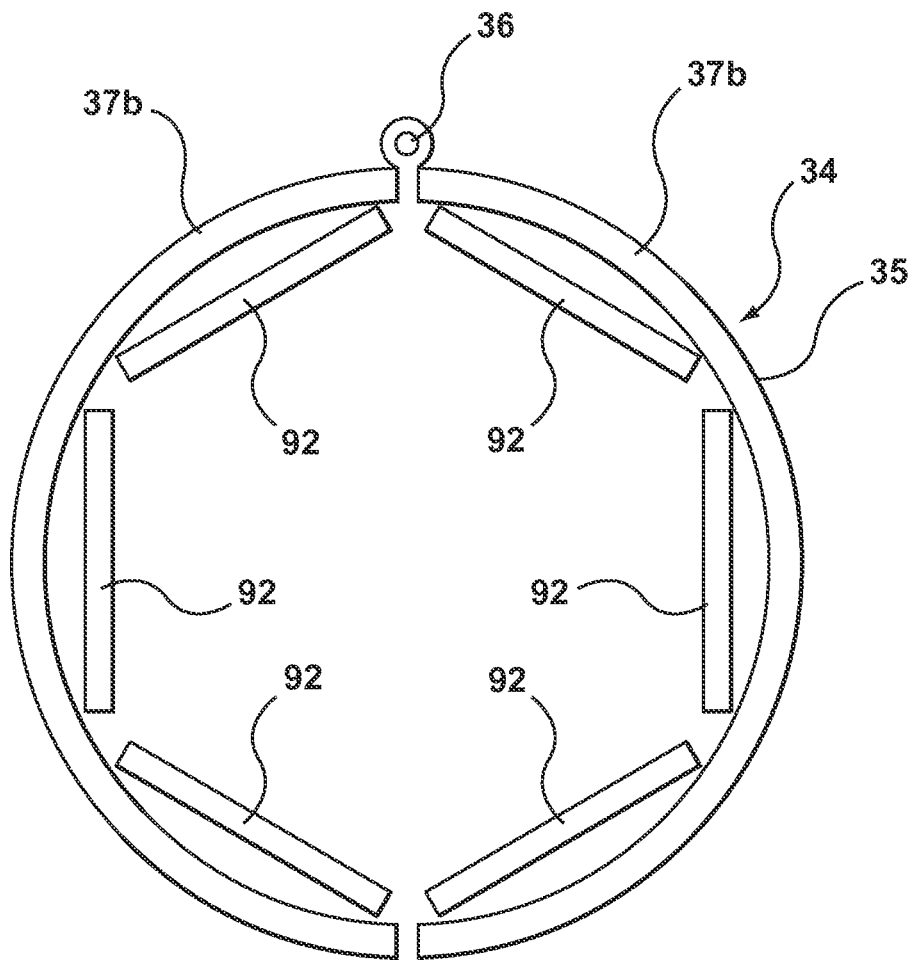
FIG. 44 shows, schematically, a cross-section view of an apparatus of yet another embodiment of the present invention.

It would be apparent to a person of skill in the art that a highly modifiable apparatus as herein described, able to be used on cutbacks of varying width, would have a very complex system of heater panels, controllers, flanges, replaceable rods, etc. Thus, a further improvement to the apparatus is to standardize and design the components into easily replaceable modules. Heating panels are already available from suppliers in rectangular "boxes" encased in a metal casing. An apparatus that could cover pipes with diameters of from 12" to 72" could be made using standardized panel widths of 6", 11" and 14", for example. These panels were combined in a polygonal arrangement to obtain the desired diameter. Panels could be readily switched to the new size based on the pipe diameter or cutback requirements. For example, FIG. 16 shows 8 panels, each 11" wide, used for a pipe diameter of 24". If a new project required an 18" pipe diameter, instead of making new panels, 6 panels 92 of the 11" size, from the 24" apparatus, could be used to make an apparatus that fits onto the 18" pipe (FIG. 44). In a further embodiment, for pipe size of 36" diameter, it was found that 11 panels of 11" width, and one panel of 6" width could be used around the circumference of the apparatus. In a similar fashion, with an inventory of only three panel sizes (6", 11", and 14", for example), devices could be built to fit all pipe diameters. Note that a person of skill in the art would readily determine designs with other standard panel widths, simply altering the number of panels required in the polygonal arrangement.

Figure 42:
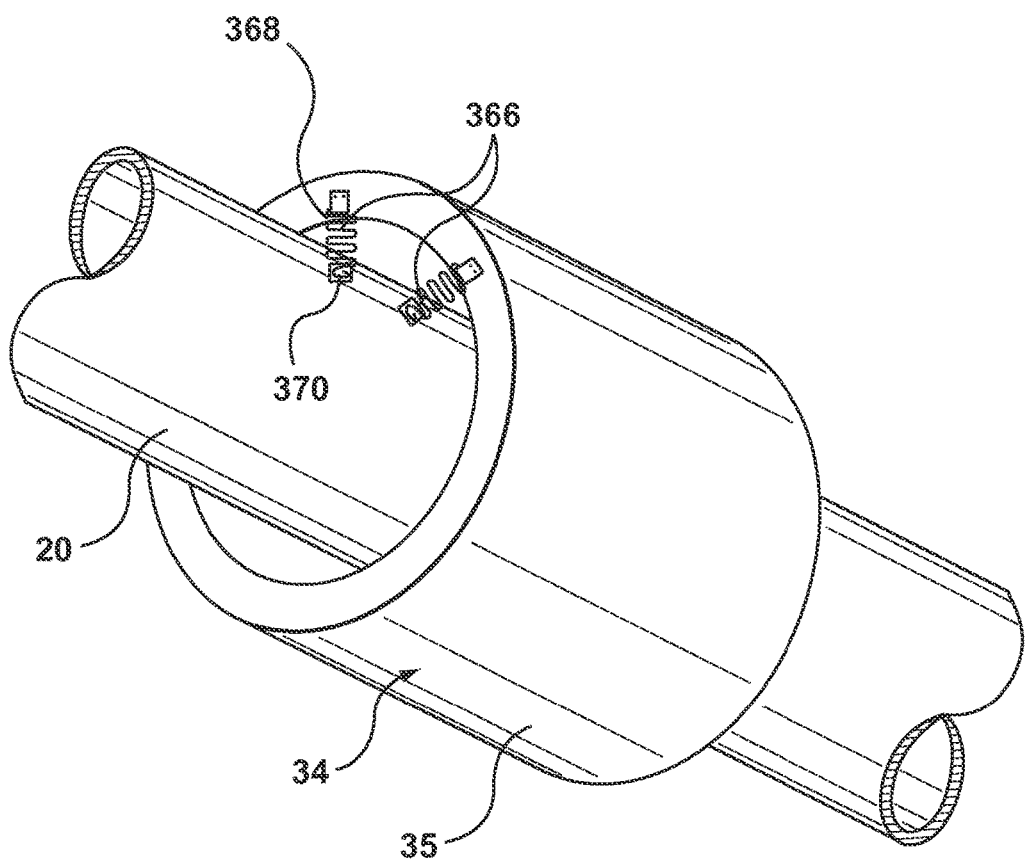
FIG. 42 shows in schematic view, a further embodiment of the present apparatus, enveloping a pipe joint.

Yet a further improvement to the apparatus is shown, in schematic form, in FIG. 42. Brakes 366 are affixed to the apparatus 34 support structure 35, and are useful where the apparatus is used in a non-horizontal position, for example, when the heat shrinking is done on an incline, as illustrated, for example on a sloping mountainous terrain. Brakes 366 can comprise springs 368 and pads 370.

Further improvements to the apparatus include:
plug and play quick connections for power and control wiring between the electrical panel and the coil;
spring loaded wheels with an axis parallel to the pipe axis, acting as rough locators for the apparatus for lowering the apparatus onto the pipe;
operator interface can control the programming of the controller 33. The operator interface can comprise multiple login levels, to control the use of the system, so that some users can have access to the systems required to operate the apparatus, while other users can have broader access to reprogram heat sequencing, to select different pipe characteristics, or to modify the apparatus programming for use on different pipes and/or with different sleeves.
The controller can be programmed externally, for example, in Excel or a spreadsheet on a computer, then the program transferred to the apparatus controller via digital media (i.e. SD card) or wirelessly;
E-stop circuitry can be implemented on the apparatus for added safety;
Signal lights and horns can be added to the apparatus frame or to the panels themselves, for added safety;
A remote control, either wired or wireless, can be used to operate the controller and the apparatus. Alternatively, the apparatus can be controlled directly from the controller;
It has been found that the electronic circuitry, and the controller, can overheat in hot ambient service conditions. Accordingly, an air conditioning unit was added to help keep the controller cool and operational;
120V plugs can be added to the controller or the electrical panel on the apparatus, for powering a laptop and/or lights, or other tools that might be helpful within proximity of the apparatus;
A 220V supply power can be provided to power the controller and actuators for set-up convenience.

Yet a further improvement to the apparatus is an integrated system for quality control. Usually, the application of a sleeve onto a joint happens on pipelines at remote locations, wherever the pipeline is being constructed, either on shore or offshore. After the pipeline construction, the pipe is usually buried in ground or placed on the seabed; accordingly, it is very difficult to perform in situ monitoring and inspection of the pipeline. The applied shrink sleeve is expected to provide corrosion protection to the joint for anywhere from 10-50 years, and sometimes even longer. Therefore, it is extremely important to ensure that the sleeve application has been conducted to proper quality and control, at every joint. It would also be desirable to have a record of each sleeve application.

Figure 43:
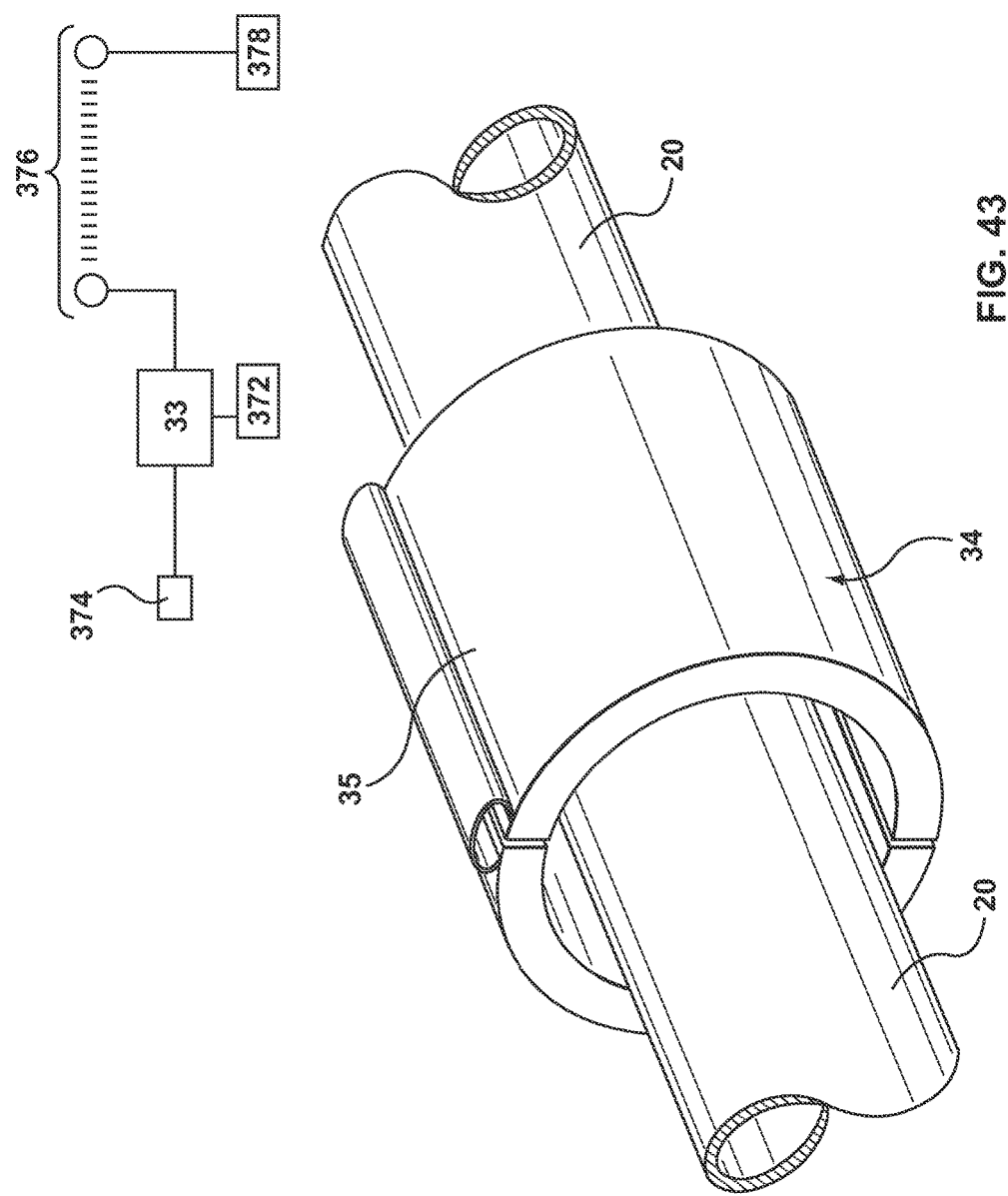
FIG. 43 shows in schematic view, a further embodiment of the present apparatus, enveloping a pipe joint.

Such a system is shown, in schematic form, in FIG. 43. The controller 33 is connected to a data storage device 372, which can be, for example, a computer, a hard drive, or a memory card, such as an SD card. On a pipeline construction, it is normal practice to identify each joint with a distinct number. The data storage device 372 can record the input of the distinct pipe joint number and the corresponding sleeve application cycle data, which would include the time, temperatures, power level, heat intensity cycling, and air application if appropriate. A digital camera 374, connected to the control panel, wired or wirelessly, can take pictures of the joint, before and after sleeve application; these pictures can also be stored as part of the data for the given joint. The data can be sent to a remote computer 378 to the interested parties, via a remote transmission, such as a wireless or satellite connection 376. This type of live data is extremely useful to the contractor building the pipeline, who is typically stationed at a control or inspection station at a different site, as well as to the pipeline owner, who may be located on another part of the world. The availability of this data would provide both an increased confidence level about the quality of the pipeline, as well as "real time" or near real-time production rates, so the interested parties can better schedule all the activities surrounding the pipeline construction.

PARTS LIST pipe 20
coating 22
weld 24
joint 25
sleeve 26
air pocket 28
insulating/reflecting layer 30
heating element layer 32
segments 32a-e
controller 33
frame apparatus 34
support structure 35
hinge 36
hinges 36a, 36b
hinge halves 37a and 37b
support structure 37c
wings 37d, 37e
line of contact or opposition 38
inner surface 39
shock absorbers 40
center zone 42a
center zone 42b
transition zones 44b and 44c
transition zones 44a and 44d
external zones 46a and 46d
external zones 46b and 46c
sinusoidal shaped ribbon 48
transition portion 52
outer portion 54
eyelet 80
cable or chain 82
support spacers 84,
support frame 86
top gap 88
bottom gap 90
heating panels 92
heating panels 92 a-h
rigid frame 94
first end 96
second end 98
overlap area 100
closure patch 102
heating panels 110-244
central zone 250
intermediate zone 252
external zone 254
first sector 256
second sector 258
third sector 260 extensors 261
bolts 262
slots 263
air tube 264
connecting tube 266
barge 267
Air 268
horizontal deck 270
orifices 272
J-lay tower 273
water 274
seabottom 276
mounting bracket 280
arms 282
body 284
mounting bar 286
frame 290
bottom portion 292
middle portion 294
upper portion 296
clamp 300
vertical legs 302
tongues 304
lips 306
closure 308
band 310
exhaust vent chamber 320
exhaust vent 324
small flaps 326
shields 328
smoke detector sensor 329
wire mesh strips 332, 330
spacers 334
body 336
arm 338
handle 340
Rod 342
covered box 343
cylinders 344, 346
flanges 350, 352
rods 354, 356, 358
shorter rods 360, 362, 364
Brakes 366
springs 368
pads 370
storage device 372
digital camera 374
satellite connection 376
remote computer 378

The invention claimed is:

1. A method for shrinking a heat shrinkable sleeve to an elongate tubular article, utilizing an apparatus comprising:
   a frame member adapted to be disposed around the elongate tubular article and the heat shrinkable sleeve, said frame member comprising a heater device adapted to heat the elongate tubular article and disposed on or proximal to an inner surface of said frame member, and a controller operating the heater device; and
   an air circulation system; and
   the method comprising:
   positioning the heat shrinkable sleeve onto the elongate tubular article to envelop the elongate tubular article circumferentially;
   enveloping the heat shrinkable sleeve with the apparatus;
   repeatedly alternating between activating the heater device on the apparatus to heat the heat shrinkable sleeve, and dispelling air from an air supply with the air circulation system to cool the heat shrinkable sleeve.

2. The method of claim 1, wherein the heating device comprises two or more longitudinally disposed heating zones and two or more radially disposed heating sectors.

3. The method of claim 2, wherein said heater device comprises a plurality of infrared heating panels mounted on said frame member.

* * * * *